United States Patent
Jia et al.

(10) Patent No.: US 11,728,919 B2
(45) Date of Patent: Aug. 15, 2023

(54) OPTICAL COMMUNICATIONS APPARATUS AND WAVELENGTH SELECTION METHOD

(71) Applicant: Huawei Technologies Co., Ltd., Shenzhen (CN)

(72) Inventors: Wei Jia, Shenzhen (CN); Bing Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 17/514,557

(22) Filed: Oct. 29, 2021

(65) Prior Publication Data
US 2022/0052778 A1 Feb. 17, 2022

Related U.S. Application Data

(63) Continuation of application No. PCT/CN2019/130590, filed on Dec. 31, 2019.

(30) Foreign Application Priority Data

Apr. 30, 2019 (CN) .......................... 201910370986.4

(51) Int. Cl.
*H04J 14/02* (2006.01)

(52) U.S. Cl.
CPC ...... *H04J 14/0212* (2013.01); *H04J 14/0204* (2013.01); *H04J 14/0217* (2013.01)

(58) Field of Classification Search
CPC ............. H04J 14/02121; H04J 14/0204; H04J 14/0217
See application file for complete search history.

(56) References Cited

U.S. PATENT DOCUMENTS

| | | | |
|---|---|---|---|
| 7,106,966 B1 * | 9/2006 | Lalonde | G02B 6/2931 398/48 |
| 7,397,980 B2 * | 7/2008 | Frisken | G02B 6/2793 385/24 |
| 8,045,854 B2 | 10/2011 | Colbourne | |

(Continued)

FOREIGN PATENT DOCUMENTS

| CN | 101726870 A | 6/2010 |
|---|---|---|
| CN | 102437879 A | 5/2012 |

(Continued)

*Primary Examiner* — Tanya T Motsinger
(74) *Attorney, Agent, or Firm* — Conley Rose, P.C.

(57) ABSTRACT

An optical communications apparatus, including a reconfigurable optical add/drop multiplexer, in which an optical deflection component may perform angle deflection on a plurality of first sub-wavelength light beams to obtain a plurality of second sub-wavelength light beams and a plurality of third sub-wavelength light beams, and propagate the plurality of second sub-wavelength light beams to a second optical switch array. A third wavelength dispersion component combines the plurality of second sub-wavelength light beams into a second light beam. A first output component outputs the second light beam from a dimension. A second wavelength dispersion component combines the plurality of third sub-wavelength light beams into a third light beam, and makes the third light beam incident to a third optical switch array. A second output component outputs the third light beam to drop a signal.

20 Claims, 21 Drawing Sheets

(56) References Cited

U.S. PATENT DOCUMENTS

| | | | |
|---|---|---|---|
| 9,307,301 B2* | 4/2016 | Suzuki | G02B 6/3518 |
| 9,913,008 B1 | 3/2018 | Keyworth et al. | |
| 10,028,040 B1 | 7/2018 | Colbourne | |
| 2004/0086218 A1* | 5/2004 | Liu | H04J 14/0213 |
| | | | 385/24 |
| 2005/0100277 A1* | 5/2005 | Frisken | G02B 6/29311 |
| | | | 385/37 |
| 2005/0213877 A1* | 9/2005 | Wu | G02B 6/3558 |
| | | | 385/18 |
| 2006/0039669 A1 | 2/2006 | Katsunuma | |
| 2007/0237451 A1* | 10/2007 | Colbourne | G02B 26/0841 |
| | | | 385/37 |
| 2009/0135488 A1* | 5/2009 | Aota | G02B 27/42 |
| | | | 359/569 |
| 2009/0154874 A1* | 6/2009 | McLaughlin | G02B 6/356 |
| | | | 385/22 |
| 2011/0217037 A1* | 9/2011 | Yoshida | G02B 6/356 |
| | | | 398/48 |
| 2011/0234951 A1* | 9/2011 | Cohen | G02B 6/29311 |
| | | | 349/113 |
| 2013/0128215 A1* | 5/2013 | Sakurai | G02B 6/35 |
| | | | 349/196 |
| 2013/0216183 A1 | 8/2013 | Neilson et al. | |
| 2014/0186038 A1* | 7/2014 | Frisken | G02F 1/31 |
| | | | 398/50 |
| 2014/0355984 A1* | 12/2014 | Yuan | H04J 14/0208 |
| | | | 398/83 |
| 2015/0085884 A1* | 3/2015 | Fontaine | H04B 10/2581 |
| | | | 370/542 |
| 2015/0124187 A1* | 5/2015 | Xie | G02F 1/293 |
| | | | 349/41 |
| 2015/0268421 A1* | 9/2015 | Higuchi | G02B 6/2938 |
| | | | 385/17 |
| 2015/0316725 A1* | 11/2015 | Nakajima | G02B 6/3588 |
| | | | 385/23 |
| 2016/0234574 A1 | 8/2016 | Wagener | |
| 2017/0041689 A1 | 2/2017 | Yan et al. | |
| 2018/0128984 A1* | 5/2018 | Yan | H04Q 11/0005 |
| 2018/0267247 A1* | 9/2018 | Yan | H04J 14/0212 |
| 2018/0278359 A1* | 9/2018 | Robertson | H04J 14/021 |
| 2020/0073054 A1* | 3/2020 | Yang | G02B 6/3558 |
| 2021/0149118 A1* | 5/2021 | Xiang | G02B 6/356 |
| 2022/0294550 A1* | 9/2022 | Hu | G02F 1/31 |

FOREIGN PATENT DOCUMENTS

| | | |
|---|---|---|
| CN | 106054322 A | 10/2016 |
| CN | 107003480 A | 8/2017 |
| CN | 107153194 A | 9/2017 |
| CN | 105409140 B | 12/2017 |
| CN | 107430247 A | 12/2017 |
| CN | 107850738 A | 3/2018 |
| CN | 108352921 A | 7/2018 |
| CN | 108702234 A | 10/2018 |
| WO | 2017008208 A1 | 1/2017 |
| WO | 2017088115 A1 | 6/2017 |

* cited by examiner

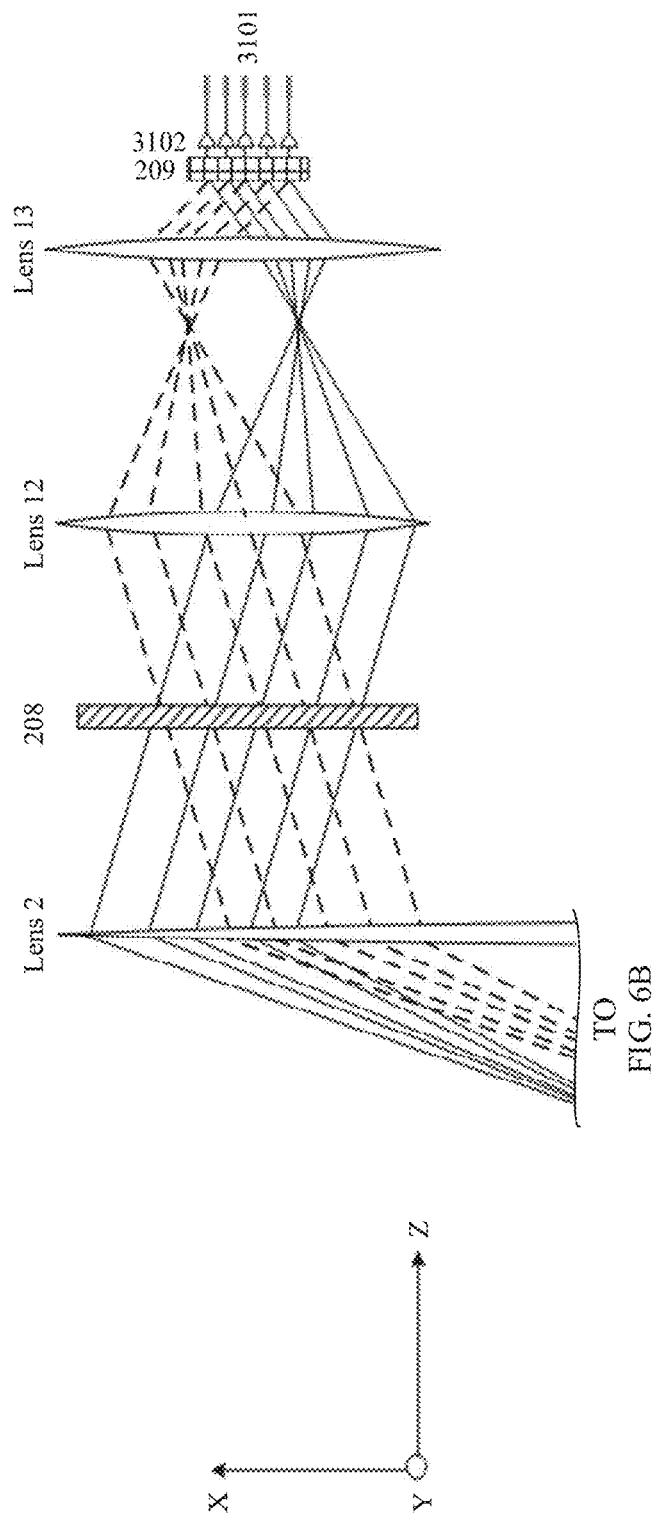

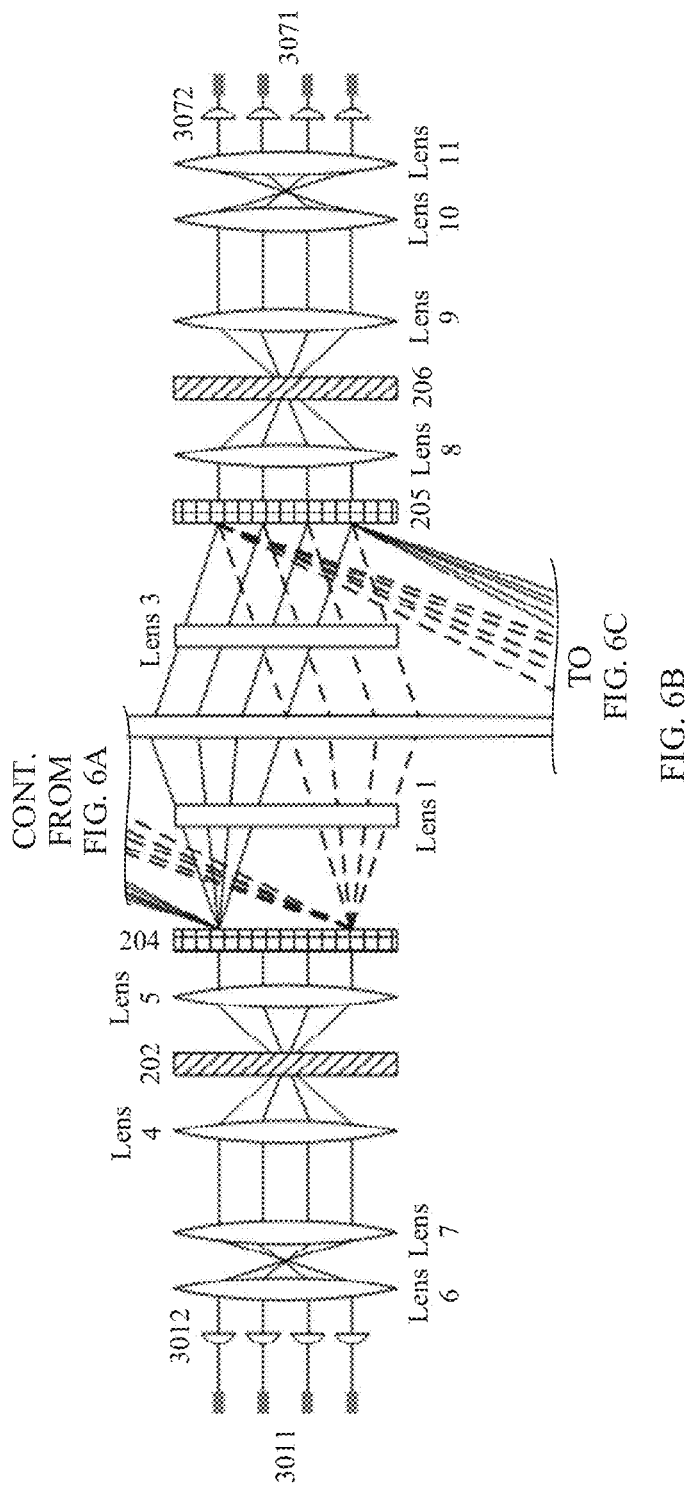

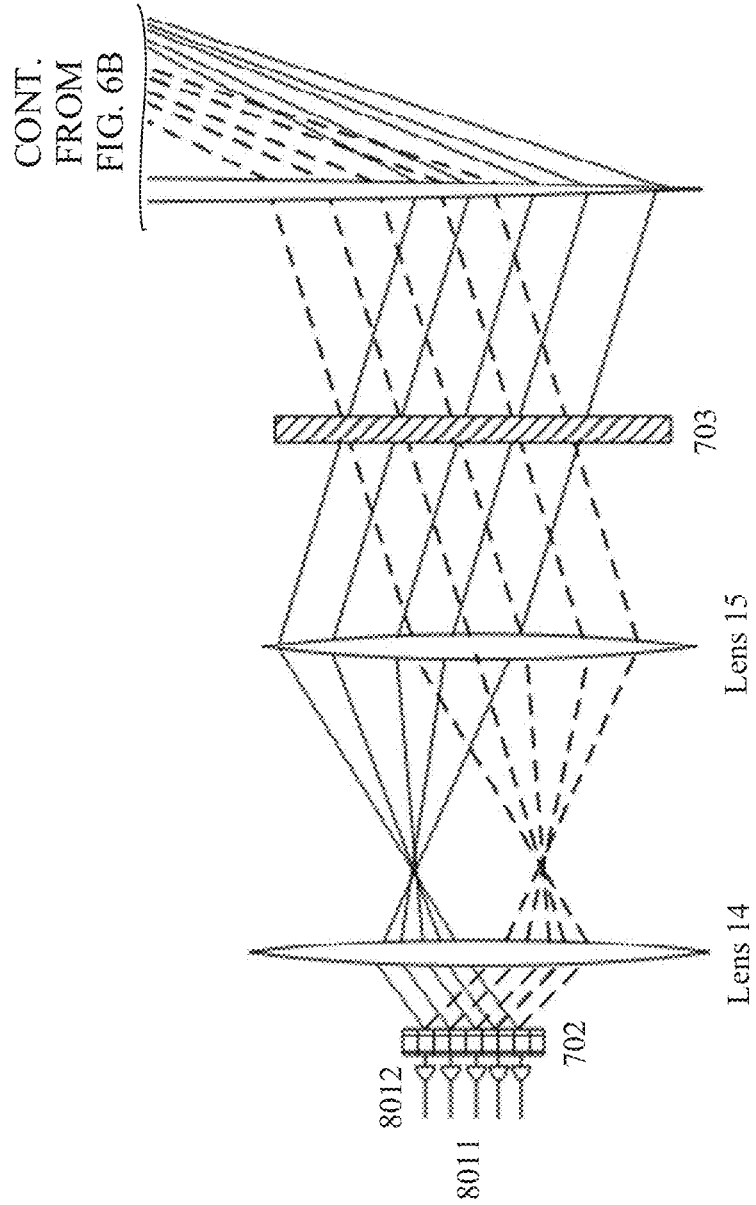

OPTICAL COMMUNICATIONS APPARATUS AND WAVELENGTH SELECTION METHOD

CROSS-REFERENCE TO RELATED APPLICATIONS

This application is a continuation of International Application No. PCT/CN2019/130590, filed on Dec. 31, 2019, which claims priority to Chinese Patent Application No. 201910370986.4, filed on Apr. 30, 2019. The disclosures of the aforementioned applications are hereby incorporated by reference in their entireties.

TECHNICAL FIELD

This application relates to the communications field, and in particular, to an optical communications apparatus and a wavelength selection method.

BACKGROUND

With rapid growth of video and cloud services, an operator pays special attention to flexibility of construction of an optical network, and reduction of construction and operating and maintenance costs of the optical network. A network node requires more dimensions (or transmission paths) of a cross-connection. The operator may use a reconfigurable optical add/drop multiplexer (reconfigurable optical add/drop multiplexer, ROADM) to remotely and automatically switch the dimensions to replace an original manual site visit manner to change an optical fiber connection, so as to meet a requirement for a dynamic network connection.

With rapid development of an ROADM technology, an ROADM (CDC ROADM for short) with colorless (wavelength-independent), directionless (directionless), and contentionless (no wavelength conflict) features is a development direction of a future ROADM architecture. "Colorless" means that any port can be used for outputting any wavelength, "directionless" means that any wavelength can be groomed to any direction, and "contentionless" means that there is no wavelength conflict when a same wavelength needs to be locally added and dropped simultaneously in a plurality of directions.

In a conventional technology, as shown in FIG. 1, an ROADM may include a line-side 1×K WSS and a client-side N×M add/drop wavelength selective switch (add/drop wavelength selective switch, ADWSS). For the client-side N×M ADWSS, the line-side 1×K wavelength selective switch (wavelength selective switch, WSS) is used to introduce input signals from N dimensions over a transmission link to an input port of the N×M ADWSS by using an optical switch array, so that signal light beams from various dimensions are incident onto a first optical switch array of the N×M ADWSS. Then, two optical switch arrays of the N×M ADWSS complete signal switching, and propagate a switched signal to an output port. The 1×K WSS includes one optical switch array, and the N×M ADWSS includes two optical switch arrays. A to-be-dropped signal passes through three optical switch arrays in total. Similarly, a to-be-added signal also needs to pass through three optical switch arrays to switch a locally added service to each dimension. Because the to-be-dropped signal and the to-be-added signal each need to pass through the three optical switch arrays, relatively large insertion losses and relatively large filtering are caused for the signals.

SUMMARY

This application provides an optical communications apparatus and a wavelength selection method. An optical path from an input port from a dimension to output from a dimension needs to pass through only two optical switch arrays, and an optical path from the input port from a dimension to output to drop a signal also needs to pass through only two optical switch arrays. In this way, insertion losses caused by one optical switch array are reduced for a to-be-dropped signal.

According to a first aspect, this application provides an optical communications apparatus, including a first input component, a first wavelength dispersion component, a second wavelength dispersion component, a third wavelength dispersion component, an optical deflection component, a second optical switch array, a third optical switch array, a first output component, and a second output component.

The first wavelength dispersion component is configured to decompose a first light beam incident from the first input component into a plurality of first sub-wavelength light beams, and propagate the plurality of first sub-wavelength light beams to the optical deflection component. The first wavelength dispersion component may decompose the first light beam incident from the first input component into the plurality of first sub-wavelength light beams, so that the plurality of first sub-wavelength light beams are dispersed on a wavelength plane, and the plurality of dispersed first sub-wavelength light beams are propagated to the optical deflection component through a redirection component, where wavelengths of the first sub-wavelength light beams are different from each other. The optical deflection component is configured to perform angle deflection on the plurality of first sub-wavelength light beams to obtain a plurality of second sub-wavelength light beams, and propagate the plurality of second sub-wavelength light beams to the second optical switch array. The optical deflection component is further configured to perform angle deflection on the plurality of first sub-wavelength light beams to obtain a plurality of third sub-wavelength light beams, and propagate the plurality of third sub-wavelength light beams to the second wavelength dispersion component. A light beam propagation direction of the second sub-wavelength light beam is different from that of the third sub-wavelength light beam.

The second optical switch array is configured to propagate the plurality of second sub-wavelength light beams to the third wavelength dispersion component.

The third wavelength dispersion component is configured to combine the plurality of second sub-wavelength light beams into a second light beam, and propagate the second light beam to the first output component. The first output component is configured to output the second light beam from a dimension. The second wavelength dispersion component is configured to combine the plurality of third sub-wavelength light beams into a third light beam, and propagate the third light beam to the third optical switch array. The third optical switch array is configured to propagate the third light beam to the second output component. The second output component is configured to output the third light beam to drop a signal.

In this embodiment of this application, the optical deflection component deflects the plurality of first sub-wavelength light beams in different light beam propagation directions for different output port types, so that the light beam output to drop a signal can bypass an optical path for output from a dimension, and be output from an output port to drop a signal. Correspondingly, the light beam output from a dimension can bypass an optical path for output to drop a signal, and be output from an output port from a dimension.

An optical path of the first light beam from an input port from a dimension to the output from a dimension needs to pass through only two optical switch arrays (the optical switch array and the second optical switch array that are included in the optical deflection component). An optical path of the first light beam from the input port from a dimension to the output to drop a signal also needs to pass through only two optical switch arrays (the optical switch array and the third optical switch array that are included in the optical deflection component). In this way, insertion losses caused by one optical switch array are reduced for a to-be-dropped signal, and filtering of the optical switch array is reduced for the to-be-dropped signal. This reduces signal filtering penalty.

In an optional design of the first aspect, the optical deflection component includes a first optical switch array and the redirection component, where the first optical switch array is configured to perform angle deflection on the plurality of first sub-wavelength light beams to obtain the plurality of second sub-wavelength light beams, and propagate the plurality of second sub-wavelength light beams to the second optical switch array through the redirection component; and the first optical switch array is further configured to perform angle deflection on the plurality of first sub-wavelength light beams to obtain the plurality of third sub-wavelength light beams, and propagate the plurality of third sub-wavelength light beams to the second wavelength dispersion component through the redirection component.

In an optional design of the first aspect, the first wavelength dispersion component is configured to decompose, on a first plane, the first light beam incident from the first input component into the plurality of first sub-wavelength light beams.

In an optional design of the first aspect, the first optical switch array is configured to perform angle deflection on the plurality of first sub-wavelength light beams on at least one of the first plane and a second plane to obtain the plurality of second sub-wavelength light beams, and propagate the plurality of second sub-wavelength light beams to the second optical switch array through the redirection component; or the first optical switch array is configured to perform angle deflection on the plurality of first sub-wavelength light beams on at least one of the first plane and the second plane to obtain the plurality of third sub-wavelength light beams, and propagate the plurality of third sub-wavelength light beams to the second wavelength dispersion component through the redirection component; and the first plane and the second plane are orthogonal to each other.

In an optional design of the first aspect, the redirection component includes a first lens, a second lens, and a third lens, where the second lens is located on a back focal plane of the first lens, the second lens is located on a front focal plane of the third lens, the second optical switch array is located on a back focal plane of the second lens, the first optical switch array is located on a front focal plane of the second lens, and the first lens, the second lens, and the third lens are configured to propagate the plurality of second sub-wavelength light beams to the second optical switch array.

In an optional design of the first aspect, the second wavelength dispersion component is located on the back focal plane of the first lens, and the first lens is further configured to propagate the plurality of third sub-wavelength light beams to the second wavelength dispersion component.

In an optional design of the first aspect, the second wavelength dispersion component is located on the back focal plane of the second lens, and the second lens is configured to propagate the plurality of third sub-wavelength light beams to the second wavelength dispersion component.

In an optional design of the first aspect, the redirection component further includes a fourth lens and a fifth lens, where the first wavelength dispersion component is located on a back focal plane of the fourth lens, the first wavelength dispersion component is located on a front focal plane of the fifth lens, and the fifth lens is configured to propagate the plurality of first sub-wavelength light beams incident from the first wavelength dispersion component to the first optical switch array.

In an optional design of the first aspect, the optical communications apparatus further includes a second input component, a fourth optical switch array, and a fourth wavelength dispersion component, where the second input component is configured to input a fourth light beam, and make the fourth light beam incident to the fourth optical switch array; the fourth optical switch array is configured to perform angle deflection on the fourth light beam to obtain a fifth light beam, and propagate the fifth light beam to the fourth wavelength dispersion component; the fourth wavelength dispersion component is configured to decompose the fifth light beam into a plurality of fourth sub-wavelength light beams, and propagate the plurality of fourth sub-wavelength light beams to the second optical switch array, the second optical switch array is further configured to perform angle deflection on the plurality of fourth sub-wavelength light beams to obtain a plurality of fifth sub-wavelength light beams, and propagate the plurality of fifth sub-wavelength light beams to the third wavelength dispersion component; the third wavelength dispersion component is configured to combine the plurality of fifth sub-wavelength light beams into a sixth light beam, and propagate the sixth light beam to the first output component; and the first output component is configured to output the sixth light beam from a dimension In an optional design of the first aspect, the fourth wavelength dispersion component is configured to decompose, on the first plane, the fifth light beam into the plurality of fourth sub-wavelength light beams.

In an optional design of the first aspect, the fourth optical switch array is configured to perform angle deflection on the fourth light beam on at least one of the first plane and the second plane to obtain the fifth light beam; the second optical switch array is further configured to perform angle deflection on the plurality of fourth sub-wavelength light beams on at least one of the first plane and the second plane to obtain the plurality of fifth sub-wavelength light beams; and the first plane and the second plane are orthogonal to each other.

In an optional design of the first aspect, the redirection component includes the first lens, the second lens, and the third lens, where the second lens is located on the back focal plane of the first lens, the second lens is located on the front focal plane of the third lens, the fourth wavelength dispersion component is located on the front focal plane of the third lens, the second optical switch array is located on the back focal plane of the third lens, and the third lens is configured to propagate the plurality of fourth sub-wavelength light beams to the second optical switch array.

In an optional design of the first aspect, the redirection component includes the first lens, the second lens, and the third lens, where the second lens is located on the back focal plane of the first lens, the second lens is located on the front focal plane of the third lens, the fourth wavelength dispersion component is located on the front focal plane of the second lens, the second optical switch array is located on the back focal plane of the second lens, and the second lens is configured to propagate the plurality of fourth sub-wavelength light beams to the second optical switch array.

In an optional design of the first aspect, the optical deflection component includes a first optical switch array, a redirection component, a first polarization control element, and a polarization beam splitting element, where the first optical switch array is configured to perform angle deflection on the plurality of first sub-wavelength light beams, and propagate the plurality of first sub-wavelength light beams to the first polarization control element through the redirection component; the first polarization control element is configured to change a polarization state of the plurality of incident first sub-wavelength light beams, and output the plurality of second sub-wavelength light beams or the plurality of third sub-wavelength light beams to the polarization beam splitting element, where a polarization state of the plurality of second sub-wavelength light beams and a polarization state of the plurality of third sub-wavelength light beams are orthogonal to each other; and if the polarization beam splitting element receives the plurality of second sub-wavelength light beams incident from the first polarization control element, the polarization beam splitting element is configured to control the light beam propagation direction of the plurality of second sub-wavelength light beams, so that the plurality of second sub-wavelength light beams are incident to the second optical switch array; and if the polarization beam splitting element receives the plurality of third sub-wavelength light beams incident from the first polarization control element, the polarization beam splitting element is configured to control the light beam propagation direction of the plurality of third sub-wavelength light beams, so that the plurality of third sub-wavelength light beams are incident to the second wavelength dispersion component, where the light beam propagation direction of the second sub-wavelength light beam is different from that of the third sub-wavelength light beam.

In an optional design of the first aspect, the optical communications apparatus further includes a second input component, a fourth optical switch array, a fourth wavelength dispersion component, and a second polarization control element, where the second input component is configured to input a fourth light beam, and make the fourth light beam incident to the fourth optical switch array; the fourth optical switch array is configured to perform angle deflection on the fourth light beam to obtain a fifth light beam, and propagate the fifth light beam to the fourth wavelength dispersion component; the fourth wavelength dispersion component is configured to decompose the fifth light beam into a plurality of fourth sub-wavelength light beams, and propagate the plurality of fourth sub-wavelength light beams to the second polarization control element; and the second polarization control element is configured to change a polarization state of the plurality of incident fourth sub-wavelength light beams, and output the plurality of fourth sub-wavelength light beams to the polarization beam splitting element, so that the polarization beam splitting element propagates the plurality of fourth sub-wavelength light beams to the second optical switch array.

In an optional design of the first aspect, the optical communications apparatus further includes a fifth wavelength dispersion component and a sixth wavelength dispersion component, where the first optical switch array is configured to perform angle deflection on the plurality of first sub-wavelength light beams and propagate the plurality of first sub-wavelength light beams to the fifth wavelength dispersion component; the fifth wavelength dispersion component is configured to combine the plurality of first sub-wavelength light beam incident from the first optical switch array, and propagate the combined light beam to the first polarization control element through the redirection component; and the sixth wavelength dispersion component is configured to decompose a light beam incident from the polarization beam splitting element into the plurality of second sub-wavelength light beams, and propagate the plurality of second sub-wavelength light beams to the second optical switch array.

According to a second aspect, this application provides a wavelength selection method. The method includes:

A first input component inputs a first light beam and propagates the first light beam to a first wavelength dispersion component.

The first wavelength dispersion component decomposes the first light beam incident from the first input component into a plurality of first sub-wavelength light beams, and propagates the plurality of first sub-wavelength light beams to an optical deflection component.

The optical deflection component performs angle deflection on the plurality of first sub-wavelength light beams to obtain a plurality of second sub-wavelength light beams, and propagates the plurality of second sub-wavelength light beams to a second optical switch array; and the optical deflection component further performs angle deflection on the plurality of first sub-wavelength light beams to obtain a plurality of third sub-wavelength light beams, and propagates the plurality of third sub-wavelength light beams to a second wavelength dispersion component, where a light beam propagation direction of the second sub-wavelength light beam is different from that of the third sub-wavelength light beam.

The second optical switch array propagates the plurality of second sub-wavelength light beams to a third wavelength dispersion component.

The third wavelength dispersion component combines the plurality of second sub-wavelength light beams into a second light beam, and propagates the second light beam to a first output component.

The first output component outputs the second light beam from a dimension.

The second wavelength dispersion component combines the plurality of third sub-wavelength light beams into a third light beam, and propagates the third light beam to a third optical switch array.

The third optical switch array propagates the third light beam to a second output component.

The second output component outputs the third light beam to drop a signal.

In an optional design of the second aspect, the optical deflection component includes a first optical switch array and a redirection component.

That the optical deflection component performs angle deflection on the plurality of first sub-wavelength light beams to obtain a plurality of second sub-wavelength light beams, and propagates the plurality of second sub-wavelength light beams to a second optical switch array; and the optical deflection component further performs angle deflection on the plurality of first sub-wavelength light beams to obtain a plurality of third sub-wavelength light beams, and propagates the plurality of third sub-wavelength light beams to a second wavelength dispersion component, where a light beam propagation direction of the second sub-wavelength light beam is different from that of the third sub-wavelength light beam includes:

The first optical switch array performs angle deflection on the plurality of first sub-wavelength light beams to obtain the plurality of second sub-wavelength light beams, and propagates the plurality of second sub-wavelength light beams to the second optical switch array through the redirection component; and the first optical switch array further performs angle deflection on the plurality of first sub-wavelength light beams to obtain the plurality of third sub-wavelength light beams, and propagates the plurality of third sub-wavelength light beams to the second wavelength dispersion component through the redirection component.

In an optional design of the second aspect, that the first wavelength dispersion component decomposes the first light beam incident from the first input component into a plurality of first sub-wavelength light beams includes:

The first wavelength dispersion component decomposes, on a first plane, the first light beam incident from the first input component into the plurality of first sub-wavelength light beams.

In an optional design of the second aspect, that the first optical switch array performs angle deflection on the plurality of first sub-wavelength light beams to obtain the plurality of second sub-wavelength light beams, and propagates the plurality of second sub-wavelength light beams to the second optical switch array through the redirection component; and the first optical switch array further performs angle deflection on the plurality of first sub-wavelength light beams to obtain the plurality of third sub-wavelength light beams, and propagates the plurality of third sub-wavelength light beams to the second wavelength dispersion component through the redirection component includes:

The first optical switch array performs angle deflection on the plurality of first sub-wavelength light beams on at least one of the first plane and a second plane to obtain the plurality of second sub-wavelength light beams, and propagates the plurality of second sub-wavelength light beams to the second optical switch array through the redirection component; the first optical switch array further performs angle deflection on the plurality of first sub-wavelength light beams on at least one of the first plane and the second plane to obtain the plurality of third sub-wavelength light beams, and propagates the plurality of third sub-wavelength light beams to the second wavelength dispersion component through the redirection component; and the first plane and the second plane are orthogonal to each other.

In an optional design of the second aspect, the redirection component includes a first lens, a second lens, and a third lens, where the second lens is located on a back focal plane of the first lens, the second lens is located on a front focal plane of the third lens, the second optical switch array is located on a back focal plane of the second lens, and the first optical switch array is located on a front focal plane of the second lens; and that the first optical switch array propagates the plurality of second sub-wavelength light beams to the second optical switch array through the redirection component includes: propagating the plurality of second sub-wavelength light beams to the second optical switch array through the first lens, the second lens, and the third lens.

In an optional design of the second aspect, the second wavelength dispersion component is located on the back focal plane of the first lens; and that the first optical switch array propagates the plurality of third sub-wavelength light beams to the second wavelength dispersion component through the redirection component includes: propagating the plurality of third sub-wavelength light beams to the second wavelength dispersion component through the first lens.

In an optional design of the second aspect, the second wavelength dispersion component is located on the back focal plane of the second lens; and that the first optical switch array propagates the plurality of third sub-wavelength light beams to the second wavelength dispersion component through the redirection component includes: propagating the plurality of third sub-wavelength light beams to the second wavelength dispersion component through the second lens.

In an optional design of the second aspect, the method further includes:

A second input component inputs a fourth light beam, and makes the fourth light beam incident to a fourth optical switch array.

The fourth optical switch array performs angle deflection on the fourth light beam to obtain a fifth light beam, and propagates the fifth light beam to a fourth wavelength dispersion component.

The fourth wavelength dispersion component decomposes the fifth light beam into a plurality of fourth sub-wavelength light beams, and propagates the plurality of fourth sub-wavelength light beams to the second optical switch array through the redirection component.

The second optical switch array further performs angle deflection on the plurality of fourth sub-wavelength light beams to obtain a plurality of fifth sub-wavelength light beams, and propagates the plurality of fifth sub-wavelength light beams to the third wavelength dispersion component.

In an optional design of the second aspect, that the fourth wavelength dispersion component decomposes the fifth light beam into a plurality of fourth sub-wavelength light beams includes:

The fourth wavelength dispersion component decomposes, on the first plane, the fifth light beam into the plurality of fourth sub-wavelength light beams.

In an optional design of the second aspect, that the fourth optical switch array performs angle deflection on the fourth light beam to obtain a fifth light beam includes:

The fourth optical switch array performs angle deflection on the fourth light beam on at least one of the first plane and the second plane to obtain the fifth light beam.

That the second optical switch array further performs angle deflection on the plurality of fourth sub-wavelength light beams to obtain a plurality of fifth sub-wavelength light beams includes:

The second optical switch array performs angle deflection on the plurality of fourth sub-wavelength light beams on at least one of the first plane and the second plane to obtain the plurality of fifth sub-wavelength light beams, where the first plane and the second plane are orthogonal to each other.

In an optional design of the second aspect, the redirection component includes the first lens, the second lens, and the third lens, where the second lens is located on the back focal plane of the first lens, the second lens is located on the front focal plane of the third lens, the fourth wavelength dispersion component is located on the front focal plane of the third lens, and the second optical switch array is located on the back focal plane of the third lens; and that the fourth wavelength dispersion component propagates the plurality of fourth sub-wavelength light beams to the second optical switch array through the redirection component includes: propagating the plurality of fourth sub-wavelength light beams to the second optical switch array through the third lens.

In an optional design of the second aspect, the redirection component includes the first lens, the second lens, and the third lens, where the second lens is located on the back focal plane of the first lens, the second lens is located on the front focal plane of the third lens, the fourth wavelength dispersion component is located on the front focal plane of the second lens, and the second optical switch array is located on the back focal plane of the second lens; and that the fourth wavelength dispersion component propagates the plurality of fourth sub-wavelength light beams to the second optical switch array through the redirection component includes: propagating the plurality of fourth sub-wavelength light beams to the second optical switch array through the second lens.

In an optional design of the second aspect, the optical deflection component includes a first optical switch array, a redirection component, a first polarization control element, and a polarization beam splitting element.

That the optical deflection component performs angle deflection on the plurality of first sub-wavelength light beams to obtain a plurality of second sub-wavelength light beams, and propagates the plurality of second sub-wavelength light beams to a second optical switch array; and the optical deflection component further performs angle deflection on the plurality of first sub-wavelength light beams to obtain a plurality of third sub-wavelength light beams, and propagates the plurality of third sub-wavelength light beams to a second wavelength dispersion component, where a light beam propagation direction of the second sub-wavelength light beam is different from that of the third sub-wavelength light beam includes:

The first optical switch array performs angle deflection on the plurality of first sub-wavelength light beams, and propagates the plurality of first sub-wavelength light beams to the first polarization control element through the redirection component.

The first polarization control element changes a polarization state of the plurality of incident first sub-wavelength light beams, and outputs the plurality of second sub-wavelength light beams or the plurality of third sub-wavelength light beams to the polarization beam splitting element, where a polarization state of the plurality of second sub-wavelength light beams and a polarization state of the plurality of third sub-wavelength light beams are orthogonal to each other.

If the polarization beam splitting element receives the plurality of second sub-wavelength light beams incident from the first polarization control element, the polarization beam splitting element controls the light beam propagation direction of the plurality of second sub-wavelength light beams, so that the plurality of second sub-wavelength light beams are incident to the second optical switch array. If the polarization beam splitting element receives the plurality of third sub-wavelength light beams incident from the first polarization control element, the polarization beam splitting element controls the light beam propagation direction of the plurality of third sub-wavelength light beams, so that the plurality of third sub-wavelength light beams are incident to the second wavelength dispersion component. The light beam propagation direction of the second sub-wavelength light beam is different from that of the third sub-wavelength light beam.

In an optional design of the second aspect, the method further includes:

A second input component inputs a fourth light beam, and makes the fourth light beam incident to a fourth optical switch array.

The fourth optical switch array performs angle deflection on the fourth light beam to obtain a fifth light beam, and propagates the fifth light beam to a fourth wavelength dispersion component.

The fourth wavelength dispersion component decomposes the fifth light beam into a plurality of fourth sub-wavelength light beams, and propagates the plurality of fourth sub-wavelength light beams to a second polarization control element.

The second polarization control element changes a polarization state of the plurality of incident fourth sub-wavelength light beams, and outputs the plurality of fourth sub-wavelength light beams to the polarization beam splitting element, so that the polarization beam splitting element propagates the plurality of fourth sub-wavelength light beams to the second optical switch array.

According to a third aspect, an embodiment of this application provides an optical communications apparatus. The apparatus includes: a first input component, a first wavelength dispersion component, an optical deflection component, a second optical switch array, a third wavelength dispersion component, and a first output component, where the first input component is configured to input a first light beam and propagate the first light beam to the first wavelength dispersion component; the first wavelength dispersion component is configured to decompose the first light beam incident from the first input component into a plurality of first sub-wavelength light beams, and propagate the plurality of first sub-wavelength light beams to the optical deflection component; the optical deflection component is configured to perform angle deflection on the plurality of first sub-wavelength light beams to obtain a plurality of second sub-wavelength light beams, and propagate the plurality of second sub-wavelength light beams to the second optical switch array; the second optical switch array is configured to propagate the plurality of second sub-wavelength light beams to the third wavelength dispersion component; the third wavelength dispersion component is configured to combine the plurality of second sub-wavelength light beams into a second light beam, and propagate the second light beam to the first output component; and the first output component is configured to output the second light beam from a dimension.

In an optional design of the third aspect, the optical deflection component includes a first optical switch array and a redirection component, where the first optical switch array is configured to perform angle deflection on the plurality of first sub-wavelength light beams to obtain the plurality of second sub-wavelength light beams, and propagate the plurality of second sub-wavelength light beams to the second optical switch array through the redirection component.

In an optional design of the third aspect, the first wavelength dispersion component is configured to decompose, on a first plane, the first light beam incident from the first input component into the plurality of first sub-wavelength light beams.

In an optional design of the third aspect, the first optical switch array is configured to perform angle deflection on the plurality of first sub-wavelength light beams on at least one of the first plane and a second plane to obtain the plurality of second sub-wavelength light beams, and propagate the plurality of second sub-wavelength light beams to the second optical switch array through the redirection component.

In an optional design of the third aspect, the optical communications apparatus further includes a second input component, a fourth optical switch array, and a fourth wavelength dispersion component, where the second input component is configured to input a fourth light beam, and make the fourth light beam incident to the fourth optical switch array; the fourth optical switch array is configured to perform angle deflection on the fourth light beam to obtain a fifth light beam, and propagate the fifth light beam to the fourth wavelength dispersion component; the fourth wavelength dispersion component is configured to decompose the fifth light beam into a plurality of fourth sub-wavelength light beams, and propagate the plurality of fourth sub-wavelength light beams to the second optical switch array; and the second optical switch array is further configured to perform angle deflection on the plurality of fourth sub-wavelength light beams to obtain a plurality of fifth sub-wavelength light beams, and propagate the plurality of fifth sub-wavelength light beams to the third wavelength dispersion component.

According to a fourth aspect, an embodiment of this application provides an optical communications apparatus. The apparatus includes: a first input component, a first wavelength dispersion component, a second wavelength dispersion component, an optical deflection component, a third optical switch array, and a second output component, where the first input component is configured to input a first light beam and propagate the first light beam to the first wavelength dispersion component; the first wavelength dispersion component is configured to decompose the first light beam incident from the first input component into a plurality of first sub-wavelength light beams, and propagate the plurality of first sub-wavelength light beams to the optical deflection component; the optical deflection component is configured to perform angle deflection on the plurality of first sub-wavelength light beams to obtain a plurality of third sub-wavelength light beams, and propagate the plurality of third sub-wavelength light beams to the second wavelength dispersion component; the second wavelength dispersion component is configured to combine the plurality of third sub-wavelength light beams into a third light beam, and propagate the third light beam to the third optical switch array; the third optical switch array is configured to propagate the third light beam to the second output component; and the second output component is configured to output the third light beam to drop a signal.

In an optional design of the fourth aspect, the optical deflection component includes a first optical switch array and a redirection component, where the first optical switch array is configured to perform angle deflection on the plurality of first sub-wavelength light beams to obtain the plurality of third sub-wavelength light beams, and propagate the plurality of third sub-wavelength light beams to the second wavelength dispersion component through the redirection component.

In an optional design of the fourth aspect, the first wavelength dispersion component is configured to decompose, on a first plane, the first light beam incident from the first input component into the plurality of first sub-wavelength light beams.

In an optional design of the fourth aspect, the first optical switch array is configured to perform angle deflection on the plurality of first sub-wavelength light beams on at least one of the first plane and a second plane to obtain the plurality of third sub-wavelength light beams, and propagate the plurality of third sub-wavelength light beams to the second wavelength dispersion component through the redirection component, where the first plane and the second plane are orthogonal to each other.

According to a fifth aspect, this application provides an optical communications apparatus. The apparatus includes: a second input component, a fourth optical switch array, a fourth wavelength dispersion component, a third wavelength dispersion component, and a first output component, where the second input component is configured to input a fourth light beam, and make the fourth light beam incident to the fourth optical switch array: the fourth optical switch array is configured to perform angle deflection on the fourth light beam to obtain a fifth light beam, and propagate the fifth light beam to the fourth wavelength dispersion component; the fourth wavelength dispersion component is configured to decompose the fifth light beam into a plurality of fourth sub-wavelength light beams, and propagate the plurality of fourth sub-wavelength light beams to the second optical switch array; the second optical switch array is configured to perform angle deflection on the plurality of fourth sub-wavelength light beams to obtain a plurality of fifth sub-wavelength light beams, and propagate the plurality of fifth sub-wavelength light beams to the third wavelength dispersion component; the third wavelength dispersion component is configured to combine the plurality of fifth sub-wavelength light beams into a sixth light beam, and propagate the sixth light beam to the first output component; and the first output component is configured to output the sixth light beam from a dimension.

In an optional design of the fifth aspect, the fourth optical switch array is configured to perform angle deflection on the fourth light beam on at least one of the first plane and a second plane to obtain the fifth light beam; the second optical switch array is further configured to perform angle deflection on the plurality of fourth sub-wavelength light beams on at least one of the first plane and the second plane to obtain the plurality of fifth sub-wavelength light beams; and the first plane and the second plane are orthogonal to each other.

It can be learned from the foregoing technical solutions that this application has the following advantages.

The embodiments of this application provide the optical communications apparatus.

The apparatus includes the first input component, the first wavelength dispersion component, the second wavelength dispersion component, the third wavelength dispersion component, the optical deflection component, the second optical switch array, the third optical switch array, the first output component, and the second output component. The first input component is configured to input the first light beam and make the first light beam incident to the first wavelength dispersion component. The first wavelength dispersion component is configured to decompose the first light beam incident from the first input component into the plurality of first sub-wavelength light beams, and propagate the plurality of first sub-wavelength light beams to the optical deflection component. The optical deflection component is configured to perform angle deflection on the plurality of first sub-wavelength light beams to obtain the plurality of second sub-wavelength light beams, and propagate the plurality of second sub-wavelength light beams to the second optical switch array. The optical deflection component is further configured to perform angle deflection on the plurality of first sub-wavelength light beams to obtain the plurality of third sub-wavelength light beams, and propagate the plurality of third sub-wavelength light beams to the second wavelength dispersion component. The light beam propagation direction of the second sub-wavelength light beam is different from that of the third sub-wavelength light beam. The second optical switch array is configured to propagate the plurality of second sub-wavelength light beams to the third wavelength dispersion component. The third wavelength dispersion component is configured to combine the plurality of second sub-wavelength light beams into the second light beam, and propagate the second light beam to the first output component. The first output component is configured to output the second light beam in the dimension. The second wavelength dispersion component is configured to combine the plurality of third sub-wavelength light beams into the third light beam, and propagate the third light beam to the third optical switch array. The third optical switch array is configured to propagate the third light beam to the second output component. The second output component is configured to output the third light beam in the dropped manner. The optical deflection component deflects the plurality of first sub-wavelength light beams in different light beam propagation directions for different output port types, so that the light beam output to drop a signal can bypass an optical path for output from a dimension, and be output from the output port to drop a signal. Correspondingly, the light beam output from a dimension can bypass the optical path for output to drop a signal, and be output from the output port from a dimension. The optical path of the first light beam from the input port from a dimension to the output from a dimension needs to pass through only the two optical switch arrays (the optical switch array and the second optical switch array that are included in the optical deflection component), and the optical path of the first light beam from the input port from a dimension to the output to drop a signal also needs to pass through only the two optical switch arrays (the optical switch array and the third optical switch array that are included in the optical deflection component). In this way, insertion losses caused by the one optical switch array are reduced for the to-be-dropped signal, and filtering of the optical switch array is reduced for the to-be-dropped signal. This reduces the signal filtering penalty.

BRIEF DESCRIPTION OF DRAWINGS

FIG. 6A to FIG. 6C are a schematic structural diagram of an optical path of an optical communications apparatus on a port switching plane according to an embodiment of the present invention.

DESCRIPTION OF EMBODIMENTS

To make objectives, technical solutions, and advantages of the present invention clearer and more comprehensible, the following further describes the present invention in detail with reference to accompanying drawings in embodiments. It should be understood that the specific embodiments described herein are merely used to explain the present invention but are not intended to limit the present invention. It is clear that the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and the accompanying drawings of this application, the terms "first", "second", and the like are intended to distinguish similar objects but do not necessarily indicate a specific order or sequence. It should be understood that the terms used in such a way are interchangeable in a proper circumstance, which is merely a discrimination manner that is used when objects having a same attribute are described in the embodiments of this application. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, system, product, or device.

The technical solutions of the present invention may be applied to various communications systems that can use signal light to transmit data, for example, a global system for mobile communications (global system of mobile communications, GSM), a code division multiple access (code division multiple access, CDMA) system, a wideband code division multiple access (wideband code division multiple access, WCDMA) system, and a general packet radio service (general packet radio service, GPRS) system, a long term evolution (long term evolution, LTE) system, and a fifth generation (5th Generation, 5G) communications system. In addition, the communications system may be further applicable to a future-oriented communications technology, and is applicable to the technical solutions provided in the embodiments of the present invention. A system architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that, with evolution of a network architecture and emergence of a new service scenario, the technical solutions provided in the embodiments of the present invention are also applicable to similar technical problems.

Figure 1:
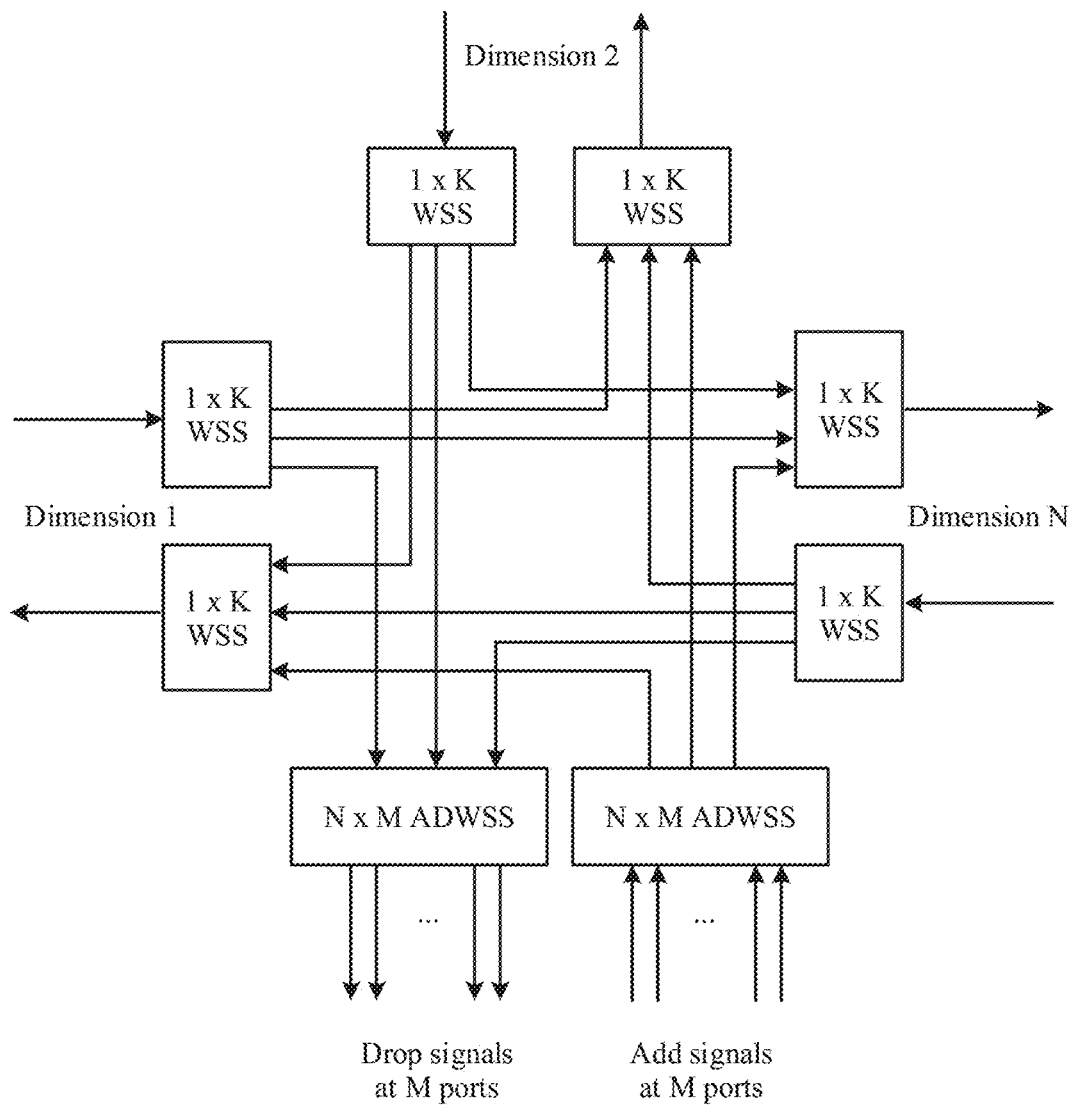
FIG. 1 is a schematic diagram of an ROADM architecture.
Figure 2:
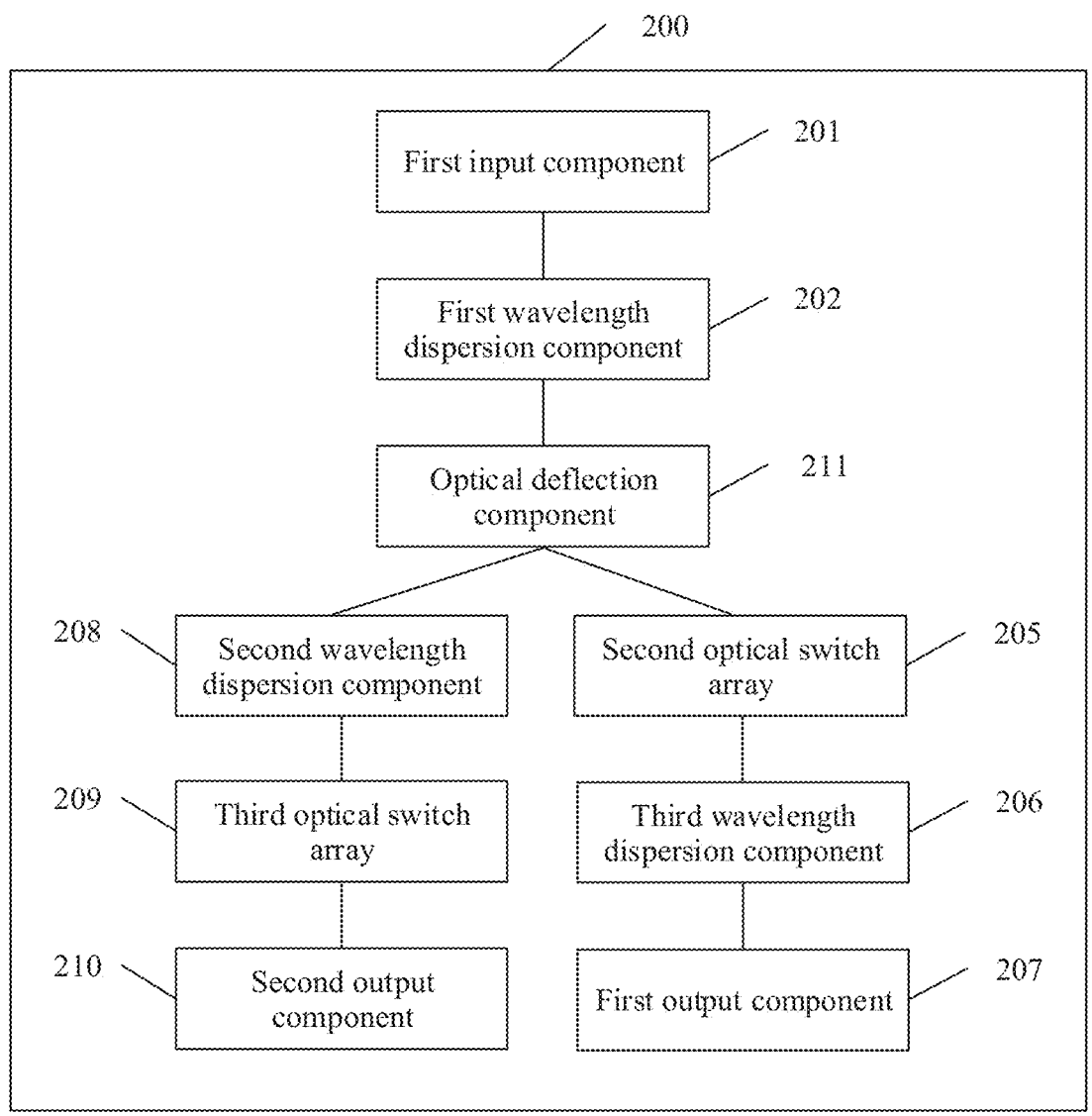
FIG. 2 is a schematic architectural diagram of an optical communications apparatus according to an embodiment of the present invention.

FIG. 2 is a schematic architectural diagram of an optical communications apparatus according to an embodiment of the present invention. Specifically, the optical communications apparatus in this embodiment may be a reconfigurable optical add/drop multiplexer ROADM. As shown in FIG. 2, an ROADM architecture provided in this embodiment of the present invention includes a first input component 201, a first wavelength dispersion component 202, an optical deflection component 211, a second wavelength dispersion component 208, a third optical switch array 209, a second output component 210, a second optical switch array 205, a third wavelength dispersion component 206, and a first output component 207.

Specifically, the first input component 201 is configured to input a first light beam and propagate the first light beam to the first wavelength dispersion component 202.

In this embodiment of this application, the first input component 201 may include N input ports. The N input ports are configured for input from a dimension, and the first input component 201 is configured to output input light beams received by the N input ports to the first wavelength dispersion component 202. Specifically, the first input component 201 may make the first light beam input from a dimension incident to the first wavelength dispersion component 202. A value of N in this embodiment is a positive integer.

The first wavelength dispersion component 202 is configured to decompose the first light beam incident from the first input component 201 into a plurality of first sub-wavelength light beams, and propagate the plurality of first sub-wavelength light beams to the optical deflection component 211.

In this embodiment of this application, the first wavelength dispersion component 202 may decompose the first light beam incident from the first input component 201 into the plurality of first sub-wavelength light beams, so that the plurality of first sub-wavelength light beams are dispersed on a wavelength plane, and the plurality of dispersed first sub-wavelength light beams are propagated to the optical deflection component 211 through a redirection component 203. Wavelengths of the first sub-wavelength light beams are different from each other.

The optical deflection component 211 is configured to perform angle deflection on the plurality of first sub-wavelength light beams to obtain a plurality of second sub-wavelength light beams, and propagate the plurality of second sub-wavelength light beams to the second optical switch array 205. The optical deflection component 211 is further configured to perform angle deflection on the plurality of first sub-wavelength light beams to obtain a plurality of third sub-wavelength light beams, and propagate the plurality of third sub-wavelength light beams to the second wavelength dispersion component 208. A light beam propagation direction of the second sub-wavelength light beam is different from that of the third sub-wavelength light beam.

The second optical switch array 205 is configured to propagate the plurality of second sub-wavelength light beams to the third wavelength dispersion component 206.

The third wavelength dispersion component 206 is configured to combine the plurality of second sub-wavelength light beams into a second light beam, and propagate the second light beam to the first output component 207.

The first output component 207 is configured to output the second light beam from a dimension.

In other words, the first output component 207 is configured to output the second light beam to different directions. The second wavelength dispersion component 208 is configured to combine the plurality of third sub-wavelength light beams into a third light beam, and propagate the third light beam to the third optical switch array 209.

The third optical switch array 209 is configured to propagate the third light beam to a corresponding output port in the second output component 210.

The second output component 210 is configured to output the third light beam to drop a signal.

It can be learned from the foregoing that, in this embodiment of this application, the optical deflection component 211 deflects the plurality of first sub-wavelength light beams in different light beam propagation directions for different output port types, so that the light beam output to drop a signal can bypass an optical path for output from a dimension, and be output from an output port to drop a signal. Correspondingly, the light beam output from a dimension can bypass an optical path for output to drop a signal, and be output from an output port from a dimension. An optical path of the first light beam from an input port from a dimension to the output from a dimension needs to pass through only two optical switch arrays (the optical switch array and the second optical switch array 205 that are included in the optical deflection component 211), and an optical path of the first light beam from the input port from a dimension to the output to drop a signal also needs to pass through only two optical switch arrays (the optical switch array and the third optical switch array 209 that are included in the optical deflection component 211). In this way, insertion losses caused by one optical switch array are reduced for a to-be-dropped signal, and filtering of the optical switch array is reduced for the to-be-dropped signal. This reduces signal filtering penalty.

Figure 3:
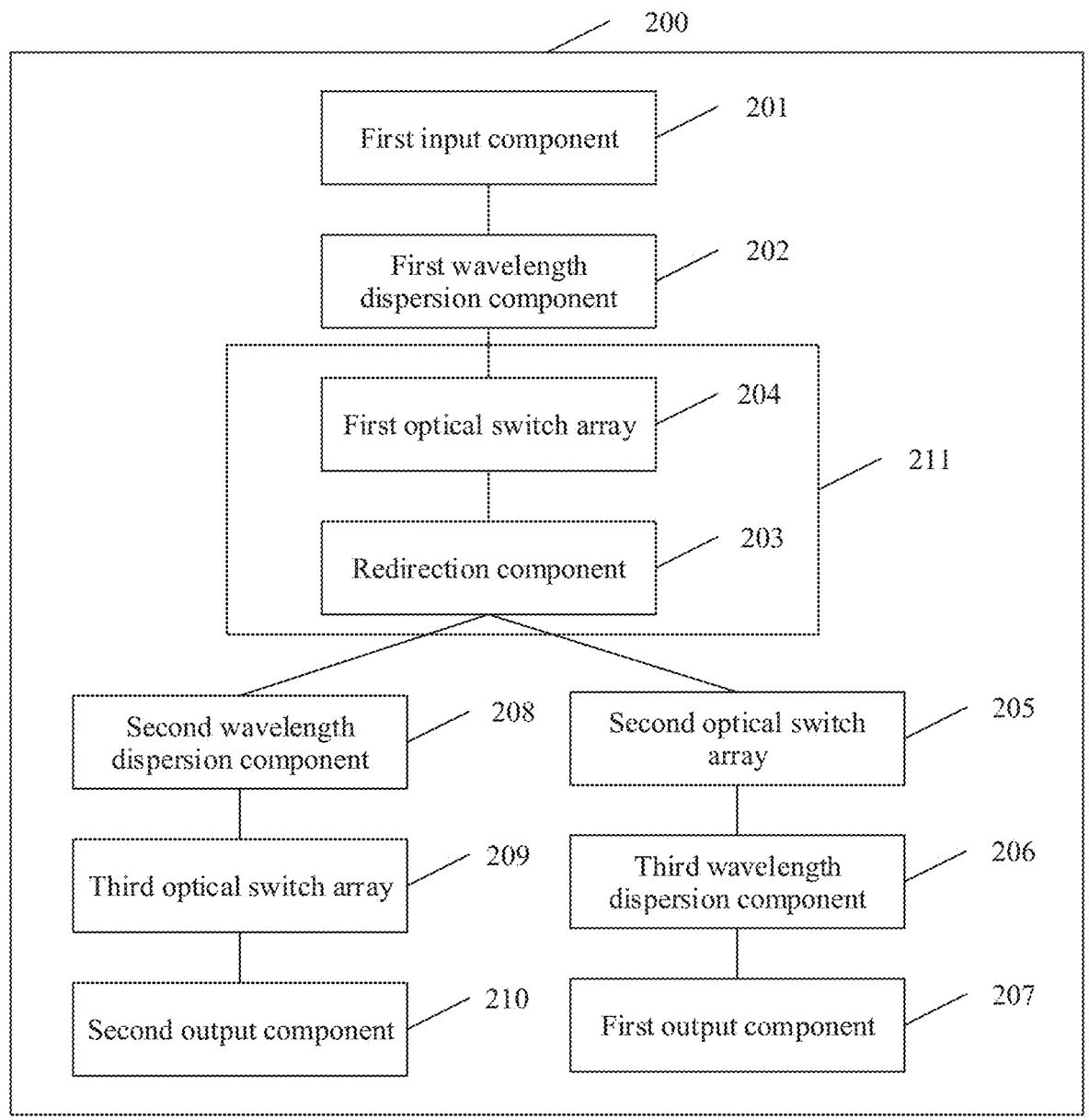
FIG. 3 is a schematic architectural diagram of an optical communications apparatus according to an embodiment of the present invention.

FIG. 3 is a schematic architectural diagram of another optical communications apparatus according to an embodiment of this application. Different from the embodiment corresponding to FIG. 2, in this embodiment of this application, the optical deflection component 211 includes a first optical switch array 204 and the redirection component 203.

In this embodiment of this application, the first optical switch array 204 is configured to perform angle deflection on the plurality of first sub-wavelength light beams to obtain the plurality of second sub-wavelength light beams, and propagate the plurality of second sub-wavelength light beams to the second optical switch array 205 through the redirection component 203. The first optical switch array 204 is further configured to perform angle deflection on the plurality of first sub-wavelength light beams to obtain the plurality of third sub-wavelength light beams, and propagate the plurality of third sub-wavelength light beams to the second wavelength dispersion component 208 through the redirection component 203.

The following describes a specific structure of the optical communications apparatus when the optical deflection component 211 includes the first optical switch array 204 and the redirection component 203.

Figure 4:
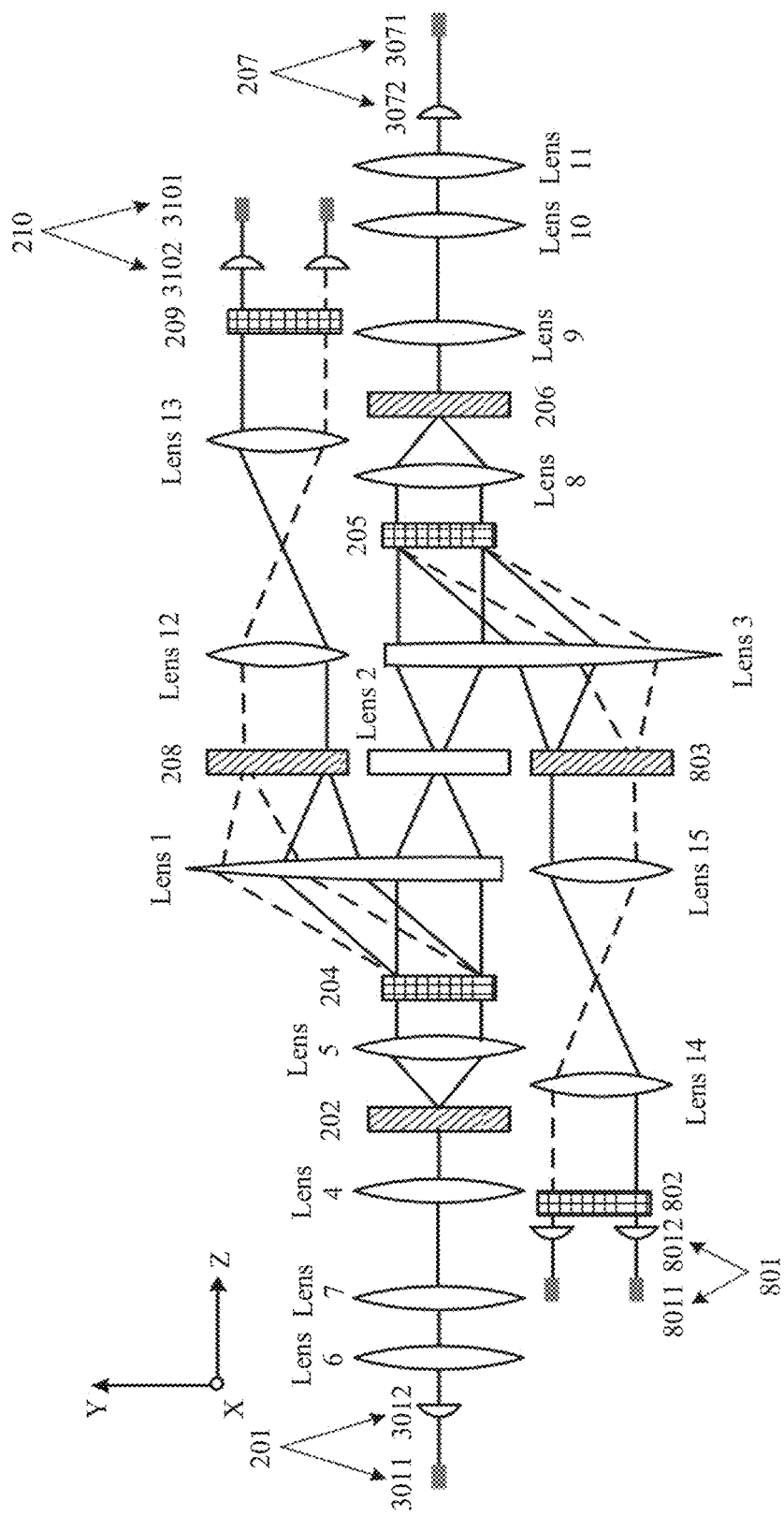
FIG. 4 is a schematic structural diagram of an optical path of an optical communications apparatus on a wavelength plane according to an embodiment of the present invention.
Figure 5A:
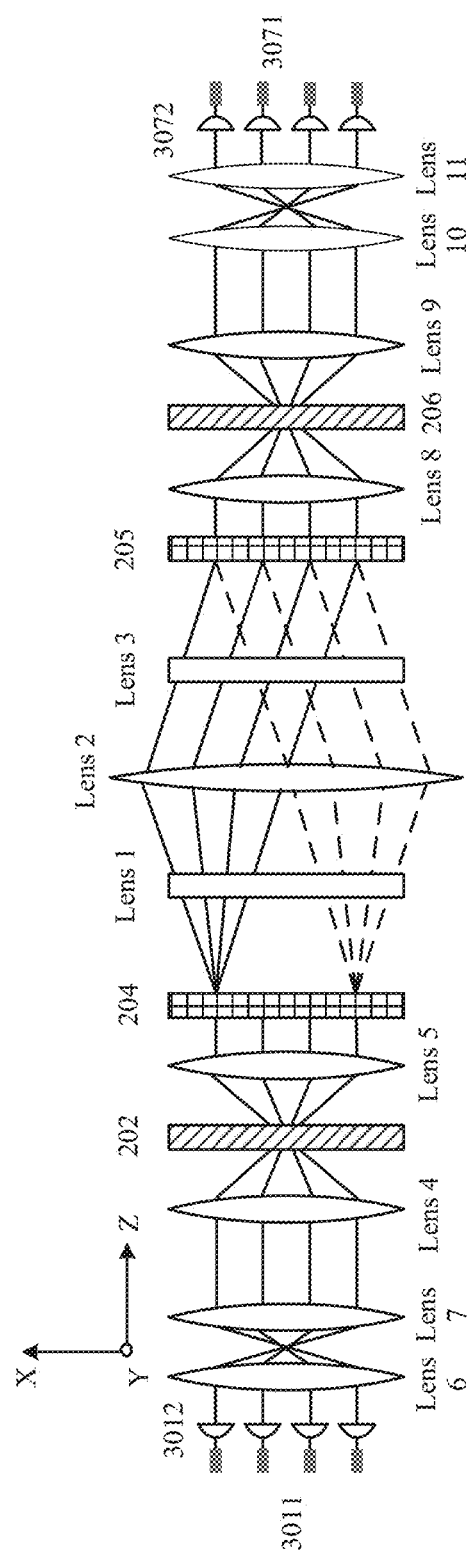
FIG. 5A is a schematic structural diagram of an optical path of an optical communications apparatus on a port switching plane according to an embodiment of the present invention.
Figure 5B:
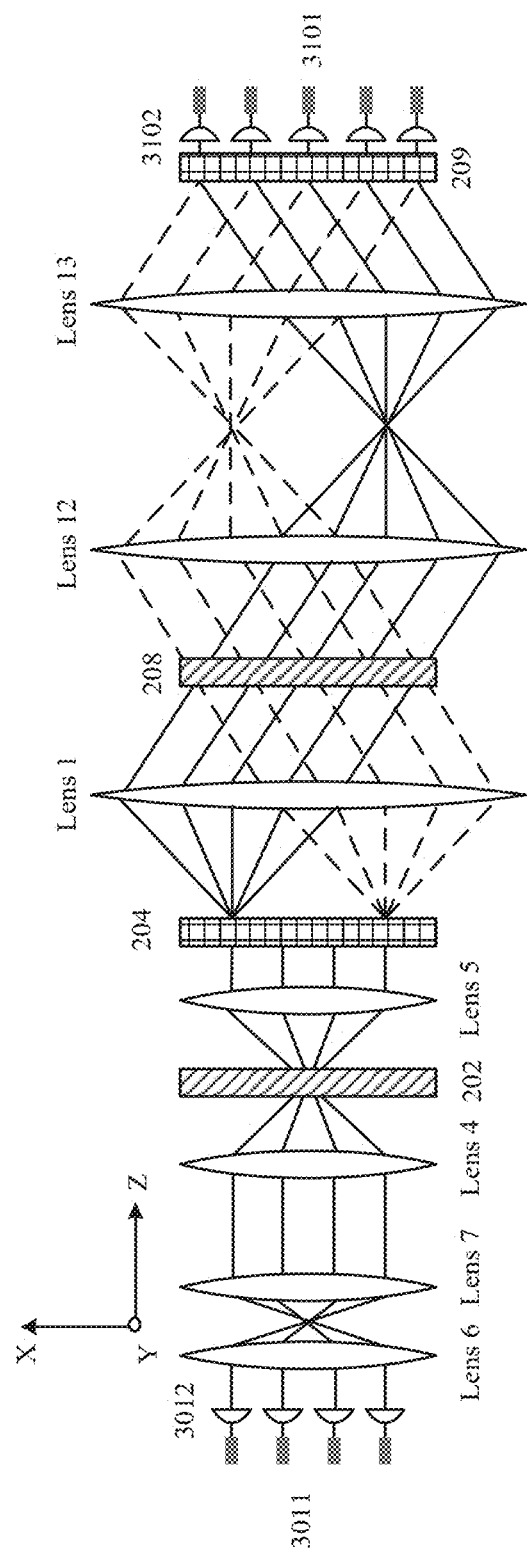
FIG. 5B is a schematic structural diagram of an optical path of an optical communications apparatus on a port switching plane according to an embodiment of the present invention.

Reference is made to FIG. 4, FIG. 5A, and FIG. 5B. FIG. 4 is a schematic structural diagram of an optical path of an optical communications apparatus on a wavelength plane according to an embodiment of the present invention. FIG. 5A is a schematic structural diagram of an optical path of an optical communications apparatus on a port switching plane according to an embodiment of the present invention. FIG. 5B is a schematic structural diagram of an optical path of an optical communications apparatus on a port switching plane according to an embodiment of the present invention. The wavelength plane is a YOZ plane, and the port switching plane is an XOZ plane. Specifically, FIG. 5A is a schematic structural diagram of an optical path from input from a dimension to output from a dimension, and FIG. 5B is a schematic structural diagram of an optical path from input from a dimension to output to drop a signal.

As shown in FIG. 4, the optical communications apparatus may include a first input component 201, a first wavelength dispersion component 202, a first optical switch array 204, a second wavelength dispersion component 208, a third optical switch array 209, a second output component 210, a second optical switch array 205, a third wavelength dispersion component 206, a first output component 207, and a lens 1 to a lens 15.

In this embodiment of this application, the first input component 201 may include N input ports. The N input ports are configured for input from a dimension, and a value of N is a positive integer. The N input ports included in the first input component 201 may be arranged in a one-dimensional manner, and are configured to obtain light beams from N dimensions. The light beams from the N dimensions may be wavelength division multiplex (wavelength division multiplex, WDM) light beams. A first light beam in this embodiment may be a WDM light beam, and one WDM light beam may include a plurality of (at least two) sub-beams. Center wavelengths of the sub-beams (or center frequencies of the sub-beams) are different from each other, and the light beams from the N dimensions may come from different directions.

In this embodiment of this application, the first light beam may be incident to one of the N input ports in the first input component 201.

Optionally, in this embodiment of this application, the first input component 201 may include an input optical fiber array 3011 and an input collimator array 3012.

The input optical fiber array 3011 may include N input optical fibers arranged in a one-dimensional manner, and the N input optical fibers are configured to obtain light beams from various dimensions. Specifically, the input optical fiber array 3011 may include the N input optical fibers arranged in the one-dimensional manner on a port switching plane.

The input collimator array 3012 may include N collimators arranged in a one-dimensional manner. The N collimators respectively correspond to the N input optical fibers, and the input collimator array 3012 is configured to convert light beams input by the N input optical fibers into collimated light beams. Specifically, the input collimator array 3012 may include the N collimators arranged in the one-dimensional manner on the port switching plane. The N collimators one-to-one correspond to the N input optical fibers. One collimator is configured to collimate a light beam output from a corresponding input optical fiber. It may also be understood as converting the light beam input from the input optical fiber into a parallel light beam, and extending a waist value of the light beam to facilitate subsequent optical path processing.

In this embodiment of this application, one of the N input optical fibers may obtain a first light beam from a dimension, and convert the first light beam into the collimated light beam by using a corresponding input collimator.

Optionally, the ROADM in this embodiment of this application may further include a spot beam expansion component including a plurality of lenses, and the spot beam expansion component is configured to change a spot size of the first light beam output by the first input component 201.

Specifically, the spot beam expansion component is configured to receive the first light beam output by the first input component 201, change a light beam characteristic of the first light beam, and then output the first light beam to the first wavelength dispersion component 202. The spot beam expansion component may include at least one lens. In FIG. 4, the lens 6 and the lens 7 constitute the spot beam expansion component configured to expand, on a wavelength plane, the collimated light beam generated by the first input component 201, and change a spot size on the first wavelength dispersion component 202. Focal lengths of the lens 6 and the lens 7 may be different, and are respectively f1 and f2. A spacing between the lens 6 and the lens 7 is a sum of f1 and f2.

In this embodiment of this application, the spot beam expansion component is disposed, so that spot switching can be performed on the light beam output by the first input component 201, and the input light beam can better meet a processing characteristic of a subsequent optical element.

In this embodiment of this application, the first wavelength dispersion component 202 is configured to decompose, on the wavelength plane, the first light beam incident from the first input component 201 into a plurality of first sub-wavelength light beams, so that the plurality of first sub-wavelength light beams are propagated to the first optical switch array 204.

In this embodiment of this application, the first wavelength dispersion component 202 may decompose, in a diffraction manner, a light beam into sub-beams with different wavelengths (or center frequencies) on the wavelength plane, so that the first sub-wavelength light beams output from the first wavelength dispersion component 202 are radiatively dispersed in a wavelength plane direction. It should be noted that, on the port switching plane, the first wavelength dispersion component does not have a function of decomposing a light beam. In an incident direction of the light beam (namely, a direction from the first input component to the first optical switch array 204), the first wavelength dispersion component 202 is configured to receive the first light beam output by the first output component 201, and transmit the first light beam to the first optical switch array 204.

In this embodiment of this application, the first wavelength dispersion component 202 may decompose a first light beam input from one input port into first sub-wavelength light beams with different wavelengths.

For example, if the first light beam includes K first sub-wavelength light beams with different wavelengths, the first wavelength dispersion component 202 may decompose the first light beam into the K first sub-wavelength light beams. The wavelengths of the K first sub-wavelength light beams are different from each other.

In this embodiment of this application, the first wavelength dispersion component 202 may include at least one dispersion unit, for example, a grating. For example, the first wavelength dispersion component 202 may be an arrayed waveguide grating, a reflection grating, a transmittance grating, a dispersion prism, or a planar waveguide grating. In addition, to increase a dispersion effect, a combination of a plurality of gratings may be used, or an optical path may be adjusted to enable a light beam to pass through a same grating for a plurality of times.

In this embodiment of this application, a redirection component 203 may be further included. Specifically, the redirection component 203 is configured to receive the plurality of first sub-wavelength light beams output by the first wavelength dispersion component 202, and redirect the plurality of first sub-wavelength light beams to one row of switch units in N rows of switch units in the first optical switch array 204.

In this embodiment of this application, the redirection component 203 may be a lens group including a plurality of lenses. The lens group may include a convex lens and/or a concave lens. Specifically, referring to FIG. 4, the redirection component 203 includes the lens 4 and the lens 5. The first wavelength dispersion component 202 is located on a back focal plane of the lens 4, and the first wavelength dispersion component 202 is located on a front focal plane of the lens 5. The lens 5 is configured to propagate the plurality of first sub-wavelength light beams incident from the first wavelength dispersion component 202 to the first optical switch array 204. Optionally, focal lengths of the lens 4 and the lens 5 may be the same, to constitute a $4f$ (f is a focal length of the lens) system. The redirection component 203 may propagate each first sub-wavelength light beam to a corresponding location in the first optical switch array 204 by changing a light beam propagation route of each first sub-wavelength light beam. In this embodiment of the present invention, the plurality of first sub-wavelength light beams may be received from the first wavelength dispersion component 202, and light beam propagation characteristics of the plurality of first sub-wavelength light beams in the wavelength plane direction may be changed, so that sub-beams with different wavelengths are propagated to different positions of the first optical switch array 204 in the wavelength plane direction. Specifically, the lens 4 may refract the first light beam on the port switching plane, the first wavelength dispersion component 202 may demultiplex the first light beam on the back focal plane of the lens 4, and the lens 5 may refract the plurality of first sub-wavelength light beams on the wavelength plane and the port switching plane, so that a light beam propagation direction of the plurality of first sub-wavelength light beams output from the lens 5 is the same as a light beam propagation direction of the first light beam input to the lens 4.

It should be noted that FIG. 4 is merely a schematic diagram, and the lens 4 and the lens 5 may alternatively be replaced with other components. This is not limited herein.

In this embodiment of this application, the first optical switch array 204 is configured to perform angle deflection on the plurality of first sub-wavelength light beams to obtain a plurality of second sub-wavelength light beams, and propagate the plurality of second sub-wavelength light beams to the second optical switch array 205 through the redirection component 203. The first optical switch array 204 is further configured to perform angle deflection on the plurality of first sub-wavelength light beams to obtain a plurality of third sub-wavelength light beams, and propagate the plurality of third sub-wavelength light beams to the second wavelength dispersion component 208 through the redirection component 203. A light beam propagation direction of the second sub-wavelength light beam is different from that of the third sub-wavelength light beam.

The first optical switch array 204 may deflect the plurality of first sub-wavelength light beams in different light beam propagation directions for different output port types, so that a light beam output to drop a signal can bypass an optical path for output from a dimension, and be output from an output port to drop a signal. Correspondingly, a light beam output from a dimension can bypass an optical path for output to drop a signal, and be output from an output port from a dimension.

In an embodiment, the first optical switch array 204 may receive a deflection instruction from an optical switch controller. If the deflection instruction indicates that the plurality of first sub-wavelength light beams need to be output from a dimension, the first optical switch array 204 performs angle deflection on the plurality of first sub-wavelength light beams to obtain the plurality of second sub-wavelength light beams, and propagates the plurality of second sub-wavelength light beams to the second optical switch array 205 through the redirection component 203.

In an embodiment, the first optical switch array 204 may receive a deflection instruction from an optical switch controller. If the deflection instruction indicates that the plurality of first sub-wavelength light beams need to be output to drop a signal, the first optical switch array 204 performs angle deflection on the plurality of first sub-wavelength light beams to obtain the plurality of third sub-wavelength light beams, and propagates the plurality of third sub-wavelength light beams to the second wavelength dispersion component 208 through the redirection component 203.

The following describes how the first optical switch array 204 deflects the plurality of first sub-wavelength light beams to obtain the plurality of second sub-wavelength light beams or the plurality of third sub-wavelength light beams.

In an embodiment, the first optical switch array 204 is configured to perform angle deflection on the plurality of first sub-wavelength light beams on at least one of a first plane and a second plane to obtain the plurality of second sub-wavelength light beams, and propagate the plurality of second sub-wavelength light beams to the second optical switch array 205 through the redirection component 203. The first optical switch array 204 is further configured to perform angle deflection on the plurality of first sub-wavelength light beams on at least one of the first plane and the second plane to obtain the plurality of third sub-wavelength light beams, and propagate the plurality of third sub-wavelength light beams to the second wavelength dispersion component 208 through the redirection component 203. The first plane and the second plane are orthogonal to each other.

Specifically, deflecting the plurality of first sub-wavelength light beams to obtain the plurality of second sub-wavelength light beams or the plurality of third sub-wavelength light beams may be classified into the following several cases:

In an embodiment, the first optical switch array 204 is configured to perform angle deflection on the plurality of first sub-wavelength light beams on the first plane to obtain the plurality of second sub-wavelength light beams. The first optical switch array 204 is further configured to perform angle deflection on the plurality of first sub-wavelength light beams on the first plane and the second plane to obtain the plurality of third sub-wavelength light beams.

In an embodiment, the first optical switch array 204 is configured to perform angle deflection on the plurality of first sub-wavelength light beams on the first plane and the second plane to obtain the plurality of second sub-wavelength light beams. The first optical switch array 204 is further configured to perform angle deflection on the plurality of first sub-wavelength light beams on the first plane to obtain the plurality of third sub-wavelength light beams.

In an embodiment, the first optical switch array 204 is configured to perform angle deflection on the plurality of first sub-wavelength light beams on the second plane to obtain the plurality of second sub-wavelength light beams. The first optical switch array 204 is further configured to perform angle deflection on the plurality of first sub-wavelength light beams on the first plane and the second plane to obtain the plurality of third sub-wavelength light beams.

In an embodiment, the first optical switch array 204 is configured to perform angle deflection on the plurality of first sub-wavelength light beams on the first plane and the second plane to obtain the plurality of second sub-wavelength light beams. The first optical switch array 204 is further configured to perform angle deflection on the plurality of first sub-wavelength light beams on the second plane to obtain the plurality of third sub-wavelength light beams.

In an embodiment, the first optical switch array 204 is configured to perform angle deflection on the plurality of first sub-wavelength light beams on the first plane based on a first preset angle to obtain the plurality of second sub-wavelength light beams. The first optical switch array 204 is further configured to perform angle deflection on the plurality of first sub-wavelength light beams on the first plane based on a second preset angle to obtain the plurality of third sub-wavelength light beams.

In an embodiment, the first optical switch array 204 is configured to perform angle deflection on the plurality of first sub-wavelength light beams on the second plane based on a first preset angle to obtain the plurality of second sub-wavelength light beams. The first optical switch array 204 is further configured to perform angle deflection on the plurality of first sub-wavelength light beams on the second plane based on a second preset angle to obtain the plurality of third sub-wavelength light beams.

In an embodiment, the first optical switch array 204 is configured to perform angle deflection on the plurality of first sub-wavelength light beams on the first plane to obtain the plurality of second sub-wavelength light beams. The first optical switch array 204 is further configured to perform angle deflection on the plurality of first sub-wavelength light beams on the second plane to obtain the plurality of third sub-wavelength light beams.

In an embodiment, the first optical switch array 204 is configured to perform angle deflection on the plurality of first sub-wavelength light beams on the second plane to obtain the plurality of second sub-wavelength light beams. The first optical switch array 204 is further configured to perform angle deflection on the plurality of first sub-wavelength light beams on the first plane to obtain the plurality of third sub-wavelength light beams.

In an embodiment, the first optical switch array 204 is configured to perform angle deflection on the plurality of first sub-wavelength light beams on the first plane based on a first preset angle and on the second plane based on a second preset angle to obtain the plurality of second sub-wavelength light beams. The first optical switch array 204 is further configured to perform angle deflection on the plurality of first sub-wavelength light beams on the first plane based on a third preset angle and on the second plane based on a fourth preset angle to obtain the plurality of third sub-wavelength light beams. The first preset angle is different from the third preset angle, and/or the second preset angle is different from the fourth preset angle. In other words, in this embodiment, the first preset angle is different from the third preset angle, and the second preset angle is the same as the fourth preset angle. Alternatively, the first preset angle is different from the third preset angle, and the second preset angle is different from the fourth preset angle. Alternatively, the first preset angle is the same as the third preset angle, and the second preset angle is different from the fourth preset angle.

In this embodiment of this application, the first optical switch array 204 may include at least N rows of switch units arranged in two dimensions. Each row of switch units includes K1 switch units, and each switch unit is configured to propagate a first sub-wavelength light beam with a wavelength corresponding to each switch unit. K1 may be a maximum quantity of sub-wavelengths of wavelength division multiplex signals input from the N input ports.

Each of the N input ports configured for input from a dimension one-to-one corresponds to each of the N rows of switch units in the first optical switch array 204, and the N rows of switch units are configured to propagate sub-beams of light beams input from N dimensions. In this embodiment of this application, one of the N rows of switch units is configured to propagate the plurality of first sub-wavelength light beams.

In this embodiment of the present invention, the first optical switch array 204 may be implemented by using a micro-electro-mechanical system (micro-electro-mechanical system, MEMS) technology. In the MEMS technology, a micro-electromechanical apparatus with geometric or operation sizes of only micron, submicron or even nanometers is highly integrated with a control circuit in a very small space on a silicon-based material or a non-silicon-based material to constitute a mechanical-electrical integration device or system. The optical switch array implemented by using the MEMS technology enables, by using an electrostatic force or another control force, a micro reflector generator to move, so that a light beam hit on the micro reflector deflects to any direction. When the first optical switch array 204 of the present invention is implemented by using the MEMS technology, a controller may control a micro mechanical structure to drive an optical modulator (a microlens) to rotate, so as to deflect an optical path.

For another example, in this embodiment of the present invention, the first optical switch array 204 may be implemented by using a liquid crystal on silicon (liquid crystal on silicon, LCOS) technology. In the LCOS technology, light diffraction angles of different wavelengths are adjusted according to a liquid crystal grating principle to deflect light. The LCOS technology is highly reliable due to absence of a movable part. In the LCOS technology, a refractive index change of a liquid crystal cell is controlled to implement a diffraction angle change, which can be easily extended and upgraded. Different wavelength channels correspond to different areas of a spatial light modulator (liquid crystal) array, and a light transmission direction is changed by adjusting a phase of a spot.

For another example, in this embodiment of the present invention, the first optical switch array 204 may be implemented by using a liquid crystal (liquid crystal, LC) technology. In the optical switch array implemented by using the LC technology, an incident light beam is split into two channels of light with two polarization states after passing through a birefringent crystal. After one channel of light passes through a half-wave plate, polarization states of the two channels of light are the same. Then, the two channels of light are hit on the first optical switch array (a liquid crystal module). An arrangement structure of a liquid crystal is changed by adjusting a voltage of the birefringent crystal (changing an angle of molecules in the crystal), so that a refractive index of the crystal changes, and a light source outputs light at different angles. The light may select two directions when passing through each layer of liquid crystal, and a plurality of optical paths may be selected after passing through a plurality of layers of liquid crystal.

For another example, in this embodiment of the present invention, the first optical switch array 204 may be implemented by using a digital light processing (digital light processing, DLP) technology. An internal structure of the optical switch array implemented by using the DLP technology is similar to an internal structure of the optical modulator implemented by using the MEMS technology. Light energy switching is implemented through deflection of the microlens. A difference is that rotation angles of a DLP micromirror have only several states that limit a quantity of output ports.

The following describes an optical path after the first optical switch array 204 propagates the plurality of deflected second sub-wavelength light beams to the second optical switch array 205 through the redirection component 203.

In this embodiment of this application, if the first optical switch array 204 determines that an output port corresponding to the plurality of first sub-wavelength light beams is an output port used for output from a dimension, the plurality of deflected second sub-wavelength light beams may be propagated to the second optical switch array 205 through the redirection component 203. The second optical switch array 205 may propagate the plurality of second sub-wavelength light beams to the third wavelength dispersion component 206.

In this embodiment of this application, the redirection component 203 may include a first lens (the lens 1), a second lens (the lens 2), and a third lens (the lens 3).

As shown in FIG. 4, the lens 2 is located on a back focal plane of the lens 1, and the lens 2 is located on a front focal plane of the lens 3. As shown in FIG. 5A, the second optical switch array 205 is located on a back focal plane of the lens 2, and the first optical switch array 204 is located on a front focal plane of the lens 2. The lens 1, the lens 2, and the lens 3 are configured to propagate the plurality of second sub-wavelength light beams to the second optical switch array 205.

In this embodiment of this application, as shown in FIG. 4, the lens 1 may converge, on the wavelength plane, the plurality of second sub-wavelength light beams output by the first optical switch array 204 to the lens 2. As shown in FIG. 5A, the lens 2 may refract, on the port switching plane, the plurality of second sub-wavelength light beams incident from the lens 1, and make the plurality of second sub-wavelength light beams incident to the lens 3. As shown in FIG. 4, the lens 3 may refract, on the wavelength plane, the plurality of second sub-wavelength light beams incident from the lens 2, so that the plurality of second sub-wavelength light beams are output from the lens 3 to the second optical switch array 205 according to a light beam propagation direction of the plurality of second sub-wavelength light beams incident to the lens 1.

In this embodiment of this application, the second optical switch array 205 is configured to propagate the plurality of second sub-wavelength light beams to the third wavelength dispersion component 206 through the redirection component 203.

In this embodiment of this application, the second optical switch array 205 may deflect the plurality of second sub-wavelength light beams on at least one of the first plane and the second plane, and propagate the plurality of deflected second sub-wavelength light beams to the third wavelength dispersion component 206 through the redirection component 203. Specifically, if the first optical switch array 204 performs angle deflection on the plurality of first sub-wavelength light beams on the wavelength plane to obtain the plurality of second sub-wavelength light beams, the second optical switch array 205 deflects the plurality of second sub-wavelength light beams on the wavelength plane. A light beam propagation direction of the plurality of deflected second sub-wavelength light beams is the same as the light beam propagation direction of the plurality of first sub-wavelength light beams incident to the first optical switch array 204. If the first optical switch array 204 performs angle deflection on the plurality of first sub-wavelength light beams on the port switching plane to obtain the plurality of second sub-wavelength light beams, the second optical switch array 205 deflects the plurality of second sub-wavelength light beams on the port switching plane. A light beam propagation direction of the plurality of deflected second sub-wavelength light beams is the same as the light beam propagation direction of the plurality of first sub-wavelength light beams incident to the first optical switch array 204. If the first optical switch array 204 performs angle deflection on the plurality of first sub-wavelength light beams on the port switching plane and the wavelength plane to obtain plurality of second sub-wavelength light beams, the second optical switch array 205 deflects the plurality of second sub-wavelength light beams on the port switching plane and the wavelength plane. The light beam propagation direction of the plurality of deflected second sub-wavelength light beams is the same as the light beam propagation direction of the plurality of first sub-wavelength light beams incident to the first optical switch array 204.

It should be noted that FIG. 4 and FIG. 5A show only a case in which the second optical switch array 205 performs angle deflection on the plurality of second sub-wavelength beams on the port switching plane. In actual application, this may include but be not limited to any one of the foregoing solutions, and is not limited herein.

In this embodiment of this application, the redirection component 203 may be a lens group including a plurality of lenses. The lens group may include a convex lens and/or a concave lens. Specifically, referring to FIG. 4, the redirection component 203 includes an eighth lens (the lens 8) and a ninth lens (the lens 9). The third wavelength dispersion component 206 is located on a back focal plane of the eighth lens, and the third wavelength dispersion component 206 is located on a front focal plane of the ninth lens. The eighth lens is configured to propagate the plurality of deflected second sub-wavelength light beams to the third wavelength dispersion component 206. Optionally, focal lengths of the eighth lens and the ninth lens may be the same, to constitute a 4*f* (f is a focal length of the lens) system. The redirection component 203 may propagate the plurality of deflected second sub-wavelength light beams to the third wavelength dispersion component 206 by changing a light beam propagation route of the plurality of deflected second sub-wavelength light beams. In this embodiment of the present invention, the eighth lens may refract, on the wavelength plane and the port switching plane, the plurality of deflected second sub-wavelength light beams, and the third wavelength dispersion component may multiplex, on the back focal plane of the eighth lens, the plurality of deflected second sub-wavelength light beams, to obtain a second light beam. The ninth lens may refract the second light beam on the port switching plane, so that a light beam propagation direction of the second light beam is the same as the light beam propagation direction of the plurality of second sub-wavelength light beams output by the second optical switch array.

It should be noted that the redirection component 203 shown in FIG. 4 is merely an example. The redirection component 203 may alternatively be another component. Configuration locations of components of the reconfigurable optical add/drop multiplexer may be different based on a difference between selected components used as the redirection component 203. In other words, transmission paths of light beams in the reconfigurable optical add/drop multiplexer are different.

In this embodiment of this application, the first output component 207 is configured to output the second light beam from a dimension.

In this embodiment of this application, the redirection component 203 and the third wavelength dispersion component 206 are disposed, so that the plurality of second sub-wavelength light beams are finally converged into one WDM beam (the second light beam), and then the WDM beam is output from a corresponding output port in the first output component 207.

In this embodiment of this application, the first output component 207 may include N output ports from dimensions configured for output from dimensions, and the second light beam may be output from one of the N output ports from dimensions. In addition, the output ports from dimensions are configured to send the light beams from the N dimensions.

In this embodiment of this application, as shown in FIG. 4, the first output component 207 may include an output optical fiber array 3071 and an output collimator array 3072.

The output optical fiber array 3072 may include N output optical fibers arranged in a one-dimensional manner, and the N output optical fibers are configured to output light beams to various dimensions.

The output collimator array 3071 may include N collimators arranged in a one-dimensional manner. The N collimators respectively correspond to the N output optical fibers, and are configured to convert the light beam into the collimated light beam. The N collimators one-to-one correspond to the N output optical fibers, and one collimator is configured to collimate a light beam.

In this embodiment of this application, one of the N output optical fibers may obtain the second light beam, and convert the second light beam into the collimated light beam by using a corresponding output collimator.

Optionally, in this embodiment of this application, a spot beam expansion component including a plurality of lenses may further be included. The spot beam expansion component is configured to change a spot size of the second light beam output by the third wavelength dispersion component.

Specifically, the spot beam expansion component is configured to receive the second light beam output by the third wavelength dispersion component 206, change a light beam characteristic of the second light beam, and then output the second light beam to the first output component 207. The spot beam expansion component may include at least one lens. For example, as shown in FIG. 4, a tenth lens (the lens 10) and an eleventh lens (the lens 11) constitute the spot beam expansion component configured to expand, on the wavelength plane, the second light beam output by the third wavelength dispersion component 206. Focal lengths of the tenth lens and the eleventh lens may be different, and are respectively f1 and f2. A spacing between the tenth lens and the eleventh lens is a sum of f1 and f2. The second light beam output by the third wavelength dispersion component is incident to the tenth lens, and is converged on a back focal plane of the tenth lens and a front focal plane of the eleventh lens. The converged light beam diverges through the eleventh lens to form a new parallel light beam.

The following describes an optical path after the first optical switch array 204 propagates the plurality of deflected third sub-wavelength light beams to the second wavelength dispersion component 208 through the redirection component 203.

In this embodiment of this application, the second wavelength dispersion component 208 is located on the back focal plane of the lens 1, and the lens 1 is configured to propagate the plurality of third sub-wavelength light beams to the second wavelength dispersion component 208.

As shown in FIG. 4 and FIG. 5B, in this embodiment of this application, the lens 1 may refract the plurality of third sub-wavelength light beams on the wavelength plane and the port switching plane. According to a geometric optical imaging principle, light beams that exit from different positions on the focal plane (for example, the front focal plane) at a same angle are incident at a same position on an image plane at different angles after passing through the lens 1. Because the plurality of third sub-wavelength light beams incident to the lens 1 are parallel to each other, the plurality of third sub-wavelength light beams may converge to a same location of the second wavelength dispersion component 208.

In this embodiment of this application, the second wavelength dispersion component 208 is configured to combine the plurality of deflected third sub-wavelength light beams into a third light beam, to propagate the third light beam to the third optical switch array 209.

The third optical switch array 209 is configured to propagate the third light beam to the second output component 210, and the second output component 210 is configured to output the third light beam to drop a signal.

Herein, the so-called "drop a signal" is obtaining downlink signal light that needs to be sent to a local node (through an output port), and the downlink signal light may be signal light from an external communications node, or may be signal light from a local communications node. This is not specifically limited in the present invention. It should be noted that, in this embodiment of the present invention, the output port used by the downlink signal light may be set randomly. For example, a quantity of output ports used by the downlink signal light may be the same as a quantity of wavelengths of the downlink signal light. In other words, one output port is configured to obtain a downlink signal light of only one wavelength. Alternatively, a same output port may be used to output a combination of plurality of sub-signal light from different ports. Alternatively, a time division multiplexing manner may be used, so that one output port is configured to receive downlink signal light of one wavelength in one time period, and receive downlink signal light of another wavelength in another time period.

In this embodiment of this application, as shown in FIG. 4, the second output component 210 may include an output optical fiber array 3101 and an output collimator array 3102.

In this embodiment of this application, the second output component 210 may include M=P×Q output ports to drop signals configured for output to drop signals, and the third light beam may be output from one of the M output ports to drop signals. In this embodiment, values of P, Q, and M are positive integers, P is a quantity of output ports to drop signals in a column in a port direction, and Q is a quantity of columns of the output ports to drop signals in a wavelength direction.

Optionally, the ROADM in this embodiment of this application may further include a spot beam expansion component including a plurality of lenses. The spot beam expansion component is configured to change a spot size of the third light beam output by the second wavelength dispersion component 208.

Specifically, the spot beam expansion component is configured to receive the third light beam output by the second wavelength dispersion component 208, change a light beam characteristic of the third light beam, and then output the third light beam to the third optical switch array 209. The spot beam expansion component may include at least one lens. For example, as shown in FIG. 4, a twelfth lens (the lens 12) and a thirteenth lens (the lens 13) constitute the spot beam expansion component configured to expand the third light beam output by the second wavelength dispersion component 208. Focal lengths of the twelfth lens and the thirteenth lens may be different, and are respectively f1 and f2. A spacing between the twelfth lens and the thirteenth lens is a sum of f1 and f2. In this embodiment, the third light beam output by the second wavelength dispersion component 208 is incident to the twelfth lens, and is converged on a back focal plane of the twelfth lens and a front focal plane of the thirteenth lens. The converged light beam diverges through the thirteenth lens to form a new parallel light beam.

In this embodiment of this application, the first optical switch array 204 deflects the plurality of first sub-wavelength light beams in different light beam propagation directions for different output port types, so that the light beam output to drop a signal can bypass the optical path for output from a dimension, and be output from the output port to drop a signal. Correspondingly, the light beam output from a dimension can bypass the optical path for output to drop a signal, and be output from the output port from a dimension. An optical path of the first light beam from an input port from a dimension to the output from a dimension needs to pass through only two optical switch arrays (the first optical switch array 204 and the second optical switch array 205), and an optical path of the first light beam from the input port from a dimension to the output to drop a signal also needs to pass through only two optical switch arrays (the first optical switch array 204 and the third optical switch array 209). In this way, insertion losses caused by one optical switch array are reduced for a to-be-dropped signal, and filtering of the optical switch array is reduced for the to-be-dropped signal. This reduces signal filtering penalty. In addition, in this embodiment, when the first light beam is transmitted on an optical path from the first input component 201 to the first output component 207 and on an optical path from the first input component 201 to the second output component 210, some optical paths and optical components (the first input component 201, the lens 6, the lens 7, the lens 4, the first wavelength dispersion component 202, the lens 5, the first optical switch array 204, and the lens 1) are shared. This reduces a quantity of optical components.

Figure 7A:
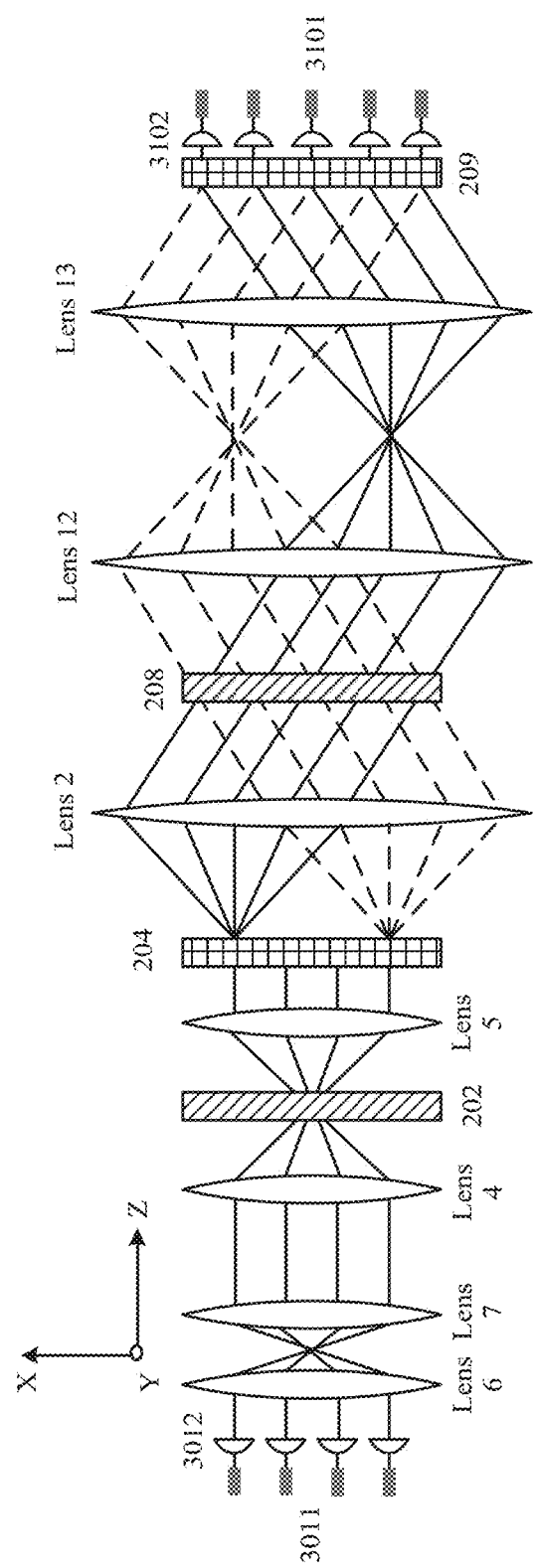
FIG. 7A is a schematic structural diagram of an optical path of an optical communications apparatus on a port switching plane according to an embodiment of the present invention.
Figure 7B:
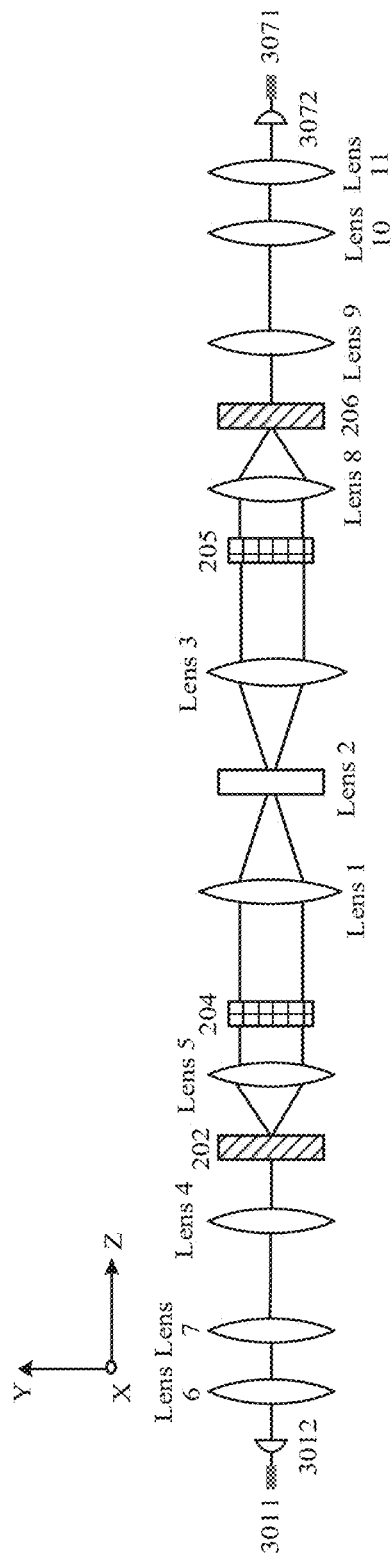
FIG. 7B is a schematic structural diagram of an optical path of an optical communications apparatus on a wavelength plane according to an embodiment of the present invention.
Figure 7C:
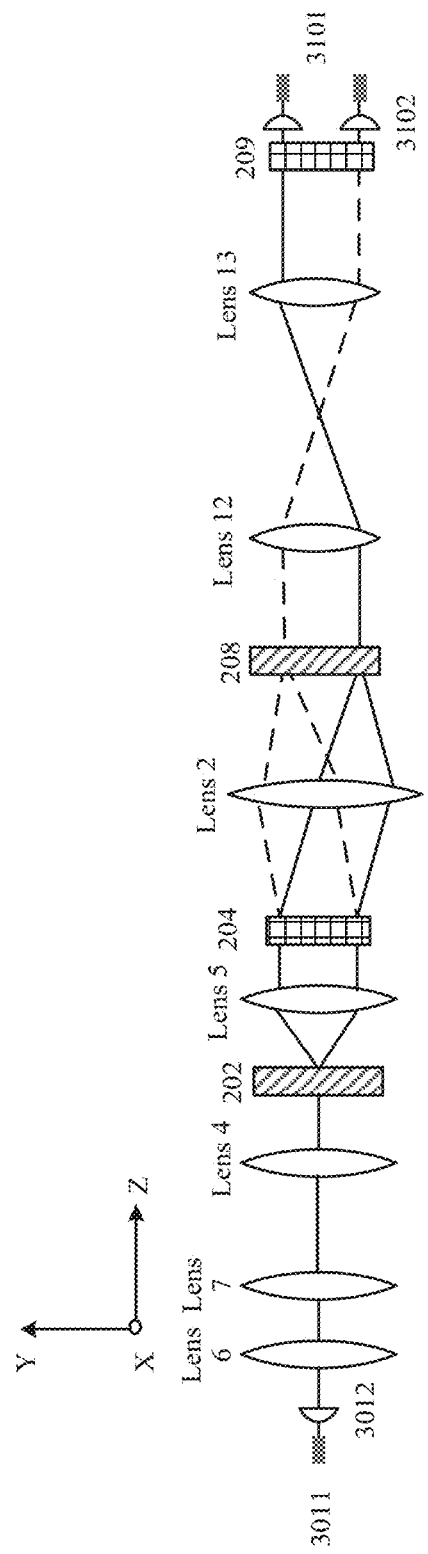
FIG. 7C is a schematic structural diagram of an optical path of an optical communications apparatus on a wavelength plane according to an embodiment of the present invention.

FIG. 6A to FIG. 6C are a schematic structural diagram of an optical path of an optical communications apparatus on a port switching plane according to an embodiment of the present invention. FIG. 7A is a schematic structural diagram of an optical path of an optical communications apparatus on a port switching plane according to an embodiment of the present invention. FIG. 7B is a schematic structural diagram of an optical path of an optical communications apparatus on a wavelength plane according to an embodiment of the present invention. FIG. 7C is a schematic structural diagram of an optical path of an optical communications apparatus on a wavelength plane according to an embodiment of the present invention. Specifically, FIG. 7A is a schematic structural diagram of an optical path from input from a dimension to output to drop a signal. FIG. 7B is a schematic structural diagram of an optical path from input from a dimension to output from a dimension. FIG. 7C is a schematic structural diagram of an optical path from input from a dimension to output to drop a signal. The wavelength plane is a YOZ plane, and the port switching plane is an XOZ plane. Specifically, as shown in FIG. 7A, the second wavelength dispersion component 208 is located on the back focal plane of the second lens (the lens 2), and the second lens is configured to propagate the plurality of third sub-wavelength light beams to the second wavelength dispersion component 208.

Different from the foregoing embodiments corresponding to FIG. 4 and FIG. 5B, in the embodiments corresponding to FIG. 4 and FIG. 5B, when the first light beam is transmitted on the optical path from the first input component to the first output component and on the optical path from the first input component to the second output component, the shared optical paths and the shared optical components include the first input component, the lens 6, the lens 7, the lens 4, the first wavelength dispersion component 202, the lens 5, the first optical switch array 204, and the lens 1. In this embodiment, when the first light beam is transmitted on the optical path from the first input component to the first output component and on the optical path from the first input component to the second output component, the shared optical paths and the shared optical components include the first input component, the lens 6, the lens 7, the lens 4, the first wavelength dispersion component 202, the lens 5, the first optical switch array 204, and the lens 2.

Figure 8:
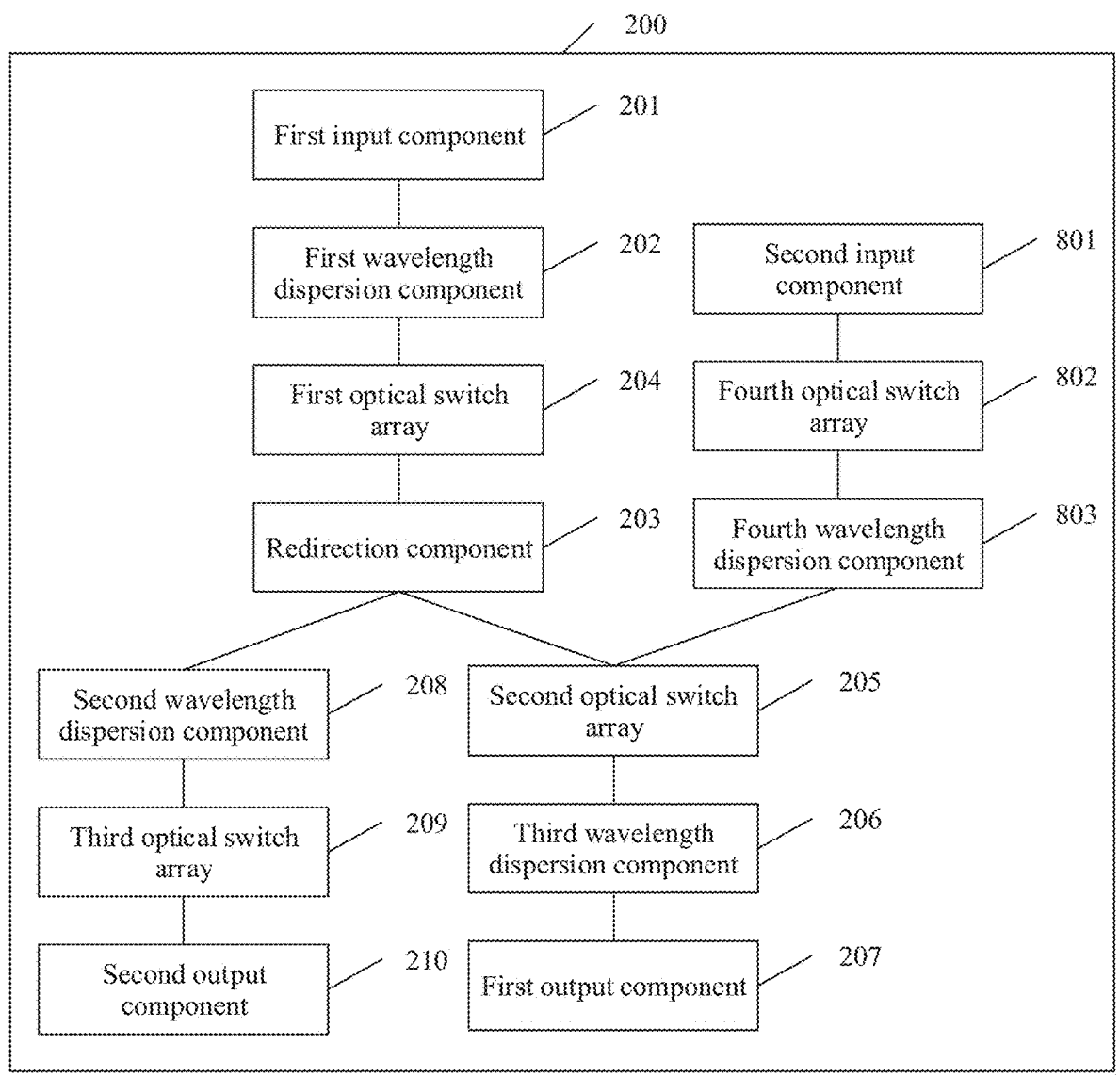
FIG. 8 is a schematic architectural diagram of an optical communications apparatus according to an embodiment of the present invention.

FIG. 8 is a schematic architectural diagram of an optical communications apparatus according to an embodiment of the present invention. Specifically, the optical communications apparatus in this embodiment may be a reconfigurable optical add/drop multiplexer ROADM. As shown in FIG. 8, an ROADM architecture provided in an embodiment of the present invention includes a first input component 201, a first wavelength dispersion component 202, a second wavelength dispersion component 208, a third wavelength dispersion component 206, a first optical switch array 204, a second optical switch array 205, a third optical switch array 209, a first output component 207, a second output component 210, a second input component 801, a fourth optical switch array 802, and a fourth wavelength dispersion component 803.

Specifically, for specific descriptions about the first input component 201, the first wavelength dispersion component 202, the second wavelength dispersion component 208, the third wavelength dispersion component 206, the first optical switch array 204, the second optical switch array 205, the third optical switch array 209, the first output component 207, the second output component 210, and related optical paths thereof, refer to the embodiments corresponding to FIG. 3, FIG. 4, FIG. 5A, and FIG. 5B, and details are not described herein again.

In this embodiment of this application, the ROADM further includes the second input component 801, the fourth optical switch array 802, and the fourth wavelength dispersion component 803.

The second input component 801 is configured to input a fourth light beam, and make the fourth light beam incident to the fourth optical switch array.

In this embodiment of this application, the second input component 801 may include M=P×Q input ports, and the M input ports are configured for input to add a signal. The second input component is configured to output input light beams received from the M input ports to the fourth optical switch array 802. Specifically, the second input component 801 may make the fourth light beam input to add a signal incident to the fourth optical switch array 802. In this embodiment, values of P, Q, and M are positive integers, P is a quantity of input ports to add signals in a column in a port direction, and Q is a quantity of columns of the input ports to add signals in a wavelength direction.

The fourth optical switch array 802 is configured to perform angle deflection on the fourth light beam to obtain a fifth light beam, and propagate the fifth light beam to the fourth wavelength dispersion component 803.

In this embodiment of this application, the fourth optical switch array 802 may perform angle deflection on the fourth light beam on a port switching plane to obtain the fifth light beam, and propagate the fifth light beam to the fourth wavelength dispersion component 803.

The fourth wavelength dispersion component 803 is configured to decompose the fifth light beam into a plurality of fourth sub-wavelength light beams, and propagate the plurality of fourth sub-wavelength light beams to the second optical switch array.

In this embodiment of this application, the fourth optical switch array 802 may perform angle deflection on the fourth light beam on the wavelength plane to obtain the fifth light beam, and propagate the fifth light beam to the fourth wavelength dispersion component 803.

The second optical switch array 205 is further configured to perform angle deflection on the plurality of fourth sub-wavelength light beams to obtain a plurality of fifth sub-wavelength light beams, and propagate the plurality of fifth sub-wavelength light beams to the third wavelength dispersion component 206 through the redirection component 203.

In this embodiment of this application, the second optical switch array 205 may perform angle deflection on the plurality of fourth sub-wavelength light beams on at least one of the wavelength plane and the port switching plane to obtain the plurality of fifth sub-wavelength light beams, and propagate the plurality of fifth sub-wavelength light beams to the third wavelength dispersion component 206.

It can be learned from the foregoing that, in this embodiment of this application, for a light beam input to add a signal of a client, an optical path of the fourth light beam from an input port to add a signal to output from a dimension needs to pass through only two optical switch arrays (the fourth optical switch array 802 and the second optical switch array 205). In this way, insertion losses caused by one optical switch array are reduced for a to-be-added signal, and filtering of the optical switch array is reduced for the to-be-added signal. This reduces signal filtering penalty.

Figure 9A:
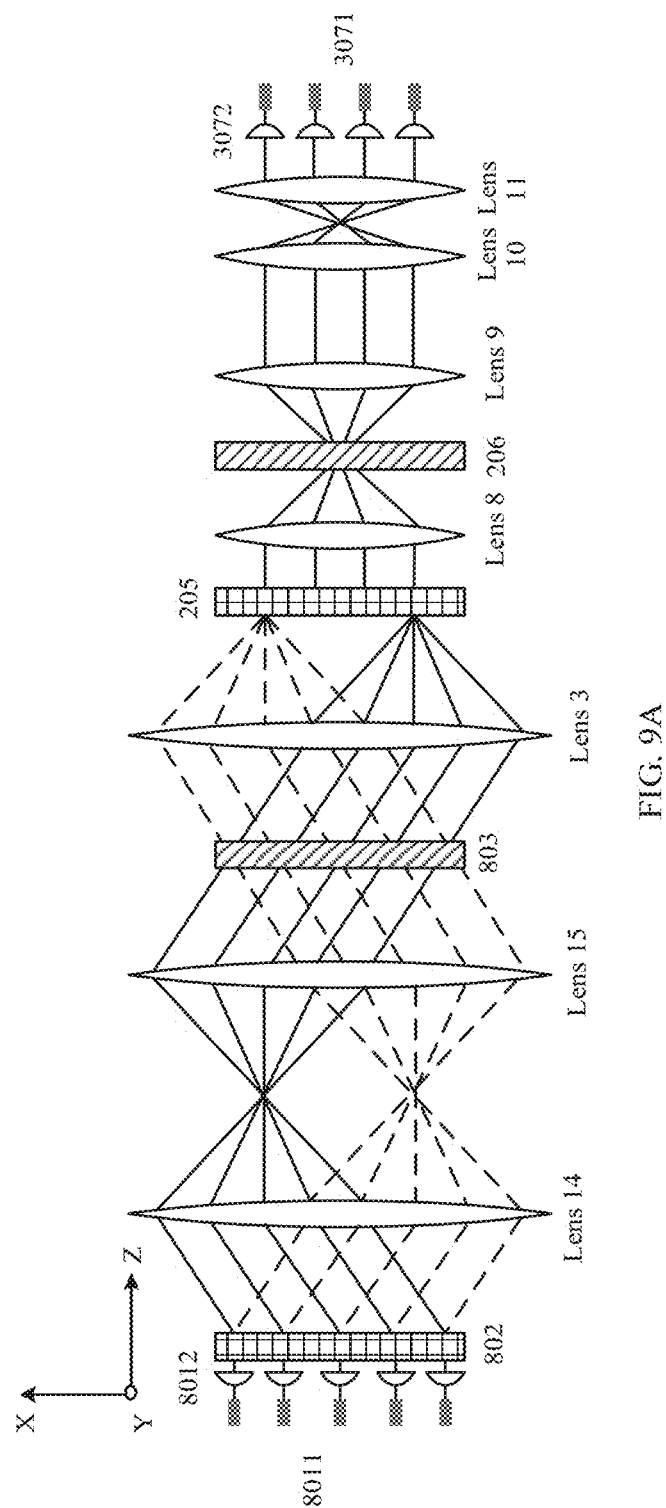
FIG. 9A is a schematic structural diagram of an optical path of an optical communications apparatus on a port switching plane according to an embodiment of the present invention.

FIG. 9A is a schematic structural diagram of an optical path of an optical communications apparatus on a port switching plane according to an embodiment of the present invention. The wavelength plane is a YOZ plane, and the port switching plane is an XOZ plane. Specifically, the optical communications apparatus further includes a second input component 801, a fourth optical switch array 802, and a fourth wavelength dispersion component 803.

Specifically, the second input component 801 is configured to input a fourth light beam, and make the fourth light beam incident to the fourth optical switch array 802.

In this embodiment of this application, the second input component 801 includes M=P×Q input ports, and the M input ports are configured for input to add signals of a client. In this embodiment, values of P, Q, and M are positive integers, P is a quantity of input ports to add signals in a column in a port direction, and Q is a quantity of columns of the input ports to add signals in a wavelength direction. The M input ports included in the second input component 801 may be arranged in a two-dimensional manner, and a light beam obtained by the second input component 801 may be a wavelength division multiplex (wavelength division multiplex, WDM) light beam. The fourth light beam in this embodiment may be a WDM light beam. One WDM light beam may include a plurality of (at least two) sub-beams, and center wavelengths of the sub-beams (or center frequencies of the sub-beams) are different from each other.

In this embodiment of this application, the fourth light beam may be incident to one of the M input ports in the second input component 801.

Optionally, in this embodiment of this application, the second input component 801 may include an input optical fiber array 8011 and an input collimator array 8012.

The input optical fiber array 8011 may include M input optical fibers arranged in a two-dimensional manner. Specifically, the input optical fiber array 8011 may include the M input optical fibers arranged in a two-dimensional manner on the wavelength plane and the port switching plane.

The input collimator array 8012 may include M collimators arranged in a two-dimensional manner. The M collimators respectively correspond to the M input optical fibers, and the input collimator array 8012 is configured to convert light beams input by the M input optical fibers into the collimated light beams. Specifically, the input collimator array 8012 may include the M collimators arranged in the two-dimensional manner on the wavelength plane and the port switching plane. The M collimators one-to-one correspond to the M input optical fibers. One collimator is configured to collimate a light beam output from a corresponding input optical fiber, and extend a waist value of the light beam to facilitate subsequent optical path processing.

In this embodiment of this application, one of the M input optical fibers may obtain the fourth light beam, and convert the fourth light beam into the collimated light beam by using a corresponding input collimator.

In this embodiment of this application, the fourth optical switch array 802 is configured to perform angle deflection on the fourth light beam to obtain a fifth light beam, and propagate the fifth light beam to the fourth wavelength dispersion component 803.

In this embodiment of this application, optionally, the fourth optical switch array 802 is configured to perform angle deflection on the fourth light beam on at least one of a first plane and a second plane to obtain the fifth light beam. The second optical switch array 802 is further configured to perform angle deflection on a plurality of fourth sub-wavelength light beams on at least one of the first plane and the second plane to obtain a plurality of fifth sub-wavelength light beams. The first plane and the second plane are orthogonal to each other.

Optionally, in this embodiment of this application, a spot beam expansion component including a plurality of lenses may further be included. The spot beam expansion component is configured to change a spot size of the fifth light beam output by the fourth optical switch array 802. Spot switching can be performed on a light beam output by the fourth optical switch array 802 by disposing the spot beam expansion component, so that an input light beam can better meet a processing characteristic of a subsequent optical element.

In this embodiment of this application, the fourth wavelength dispersion component 803 is configured to decompose, on the first plane (on the wavelength plane), the fifth light beam into the plurality of fourth sub-wavelength light beams, and propagate the plurality of fourth sub-wavelength light beams to the second optical switch array 205 through the redirection component 203.

The redirection component 203 in this embodiment of this application is configured to receive the plurality of fourth sub-wavelength light beams output by the fourth wavelength dispersion component 803, and redirect the plurality of fourth sub-wavelength light beams to corresponding positions of the second optical switch array 205.

In this embodiment of this application, the redirection component 203 may include a first lens (the lens 1), a second lens (the lens 2), and a third lens (the lens 3).

The second lens is located on a back focal plane of the first lens, the second lens is located on a front focal plane of the third lens, the fourth wavelength dispersion component is located on a front focal plane of the third lens, and the second optical switch array is located on a back focal plane of the third lens. The third lens is configured to propagate the plurality of fourth sub-wavelength light beams to the second optical switch array 205.

Specifically, the third lens is configured to refract the plurality of fourth sub-wavelength light beams on the wavelength plane and the port switching plane, and propagate the plurality of fourth sub-wavelength light beams to the second optical switch array 205.

It should be noted that the redirection component 203 shown in FIG. 9A is merely an example. The redirection component 203 may alternatively be another component. Configuration locations of components of the reconfigurable optical add/drop multiplexer may be different based on a difference between selected components used as the redirection component 203. In other words, transmission paths of light beams in the reconfigurable optical add/drop multiplexer are different.

In this embodiment of this application, the second optical switch array 205 is further configured to perform angle deflection on the plurality of fourth sub-wavelength light beams to obtain the plurality of fifth sub-wavelength light beams, and propagate the plurality of fifth sub-wavelength light beams to the third wavelength dispersion component 206 through the redirection component 203.

In this embodiment of this application, the second optical switch array 205 is further configured to perform angle deflection on the plurality of fourth sub-wavelength light beams on at least one of the wavelength plane and the port switching plane to obtain the plurality of fifth sub-wavelength light beams.

It should be noted that, a light beam that corresponds to a to-be-added signal input from an input port to add a signal and that is switched to a same output port and a light beam that corresponds to a signal input from a dimension and that is switched to the same output port have a same spot location in the second optical switch array 205.

It can be learned from the foregoing that, in this embodiment, for the light beam input to add a signal of the client, the optical path of the fourth light beam from the input port to add a signal to the output from a dimension needs to pass through only two optical switch arrays (the fourth optical switch array 802 and the second optical switch array 205). In this way, the insertion losses caused by the one optical switch array are reduced for the to-be-added signal, and filtering of the optical switch array is reduced for the to-be-added signal. This reduces the signal filtering penalty. In addition, in this embodiment, the fourth light beam is transmitted on an optical path from the second input component 801 to the first output component 207 and on an optical path from the first input component 201 to the first output component 207, the shared optical paths and the shared optical components include the second optical switch array 205, a lens 8, the third wavelength dispersion component 206, a lens 9, a lens 10, a lens 11, the first output component 207, and a lens 3. Compared with the conventional technology, a quantity of optical components is reduced.

Figure 9B:
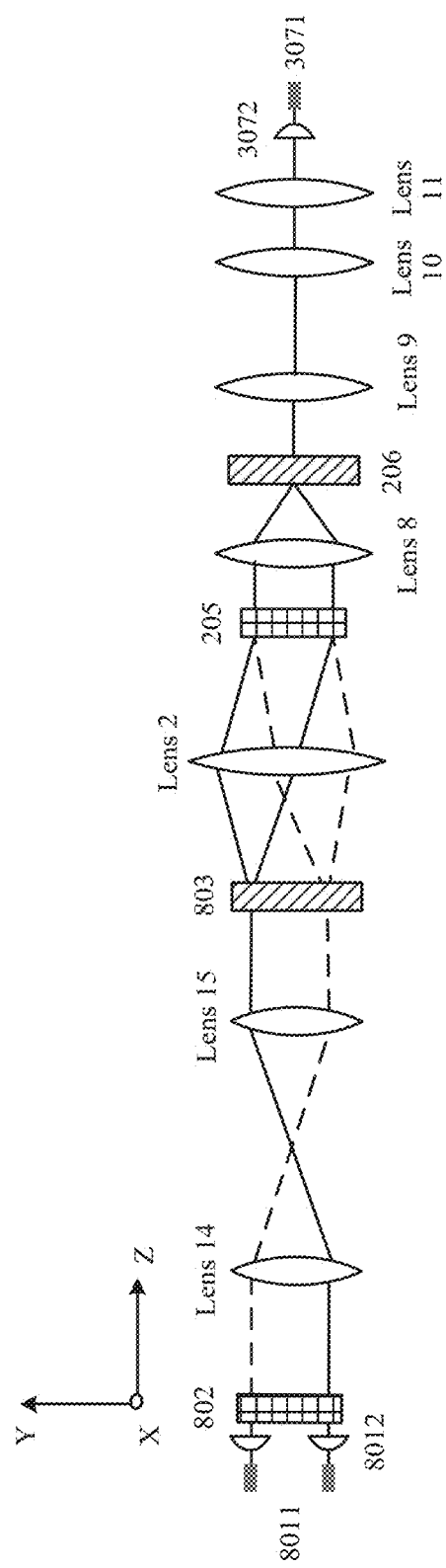
FIG. 9B is a schematic structural diagram of an optical path of an optical communications apparatus on a wavelength plane according to an embodiment of the present invention.

FIG. 9B is a schematic structural diagram of an optical path of an optical communications apparatus on a wavelength plane according to an embodiment of the present invention. Specifically, FIG. 9B is a schematic structural diagram of an optical path from input to add a signal to output from a dimension. The wavelength plane is a YOZ plane, and a port switching plane is an XOZ plane. Specifically, as shown in FIG. 9B, a second lens (the lens 2) is located on a back focal plane of a first lens (a lens 1), the second lens (the lens 2) is located on a front focal plane of a third lens (a lens 3), the fourth wavelength dispersion component 803 is located on a front focal plane of the second lens (the lens 2), and the second optical switch array 205 is located on a back focal plane of the second lens (the lens 2). The second lens (the lens 2) is configured to propagate the plurality of fourth sub-wavelength light beams to the second optical switch array 205.

Different from the foregoing embodiments corresponding to FIG. 4 and FIG. 9A, in this embodiment, the fourth light beam is transmitted on the optical path from the second input component 801 to the first output component 207 and on the optical path from the first input component 201 to the first output component 207, the shared optical paths and the shared optical components include the second optical switch array 205, the lens 8, the third wavelength dispersion component 206, the lens 9, the lens 10, the lens 11, the first output component 207, and the lens 2. In the embodiments corresponding to FIG. 4 and FIG. 9A, on the optical path from the second input component 801 to the first output component 207 and the optical path from the first input component 201 to the first output component 207, the shared optical paths and the shared optical components include the second optical switch array 205, the lens 8, the third wavelength dispersion component 206, the lens 9, the lens 10, the lens 11, the first output component 207, and the lens 3.

The following describes a specific structure of the optical communications apparatus when the optical deflection component includes the first optical switch array 204, the redirection component 203, a first polarization control element 901, and a polarization beam splitting element 902.

Figure 10:
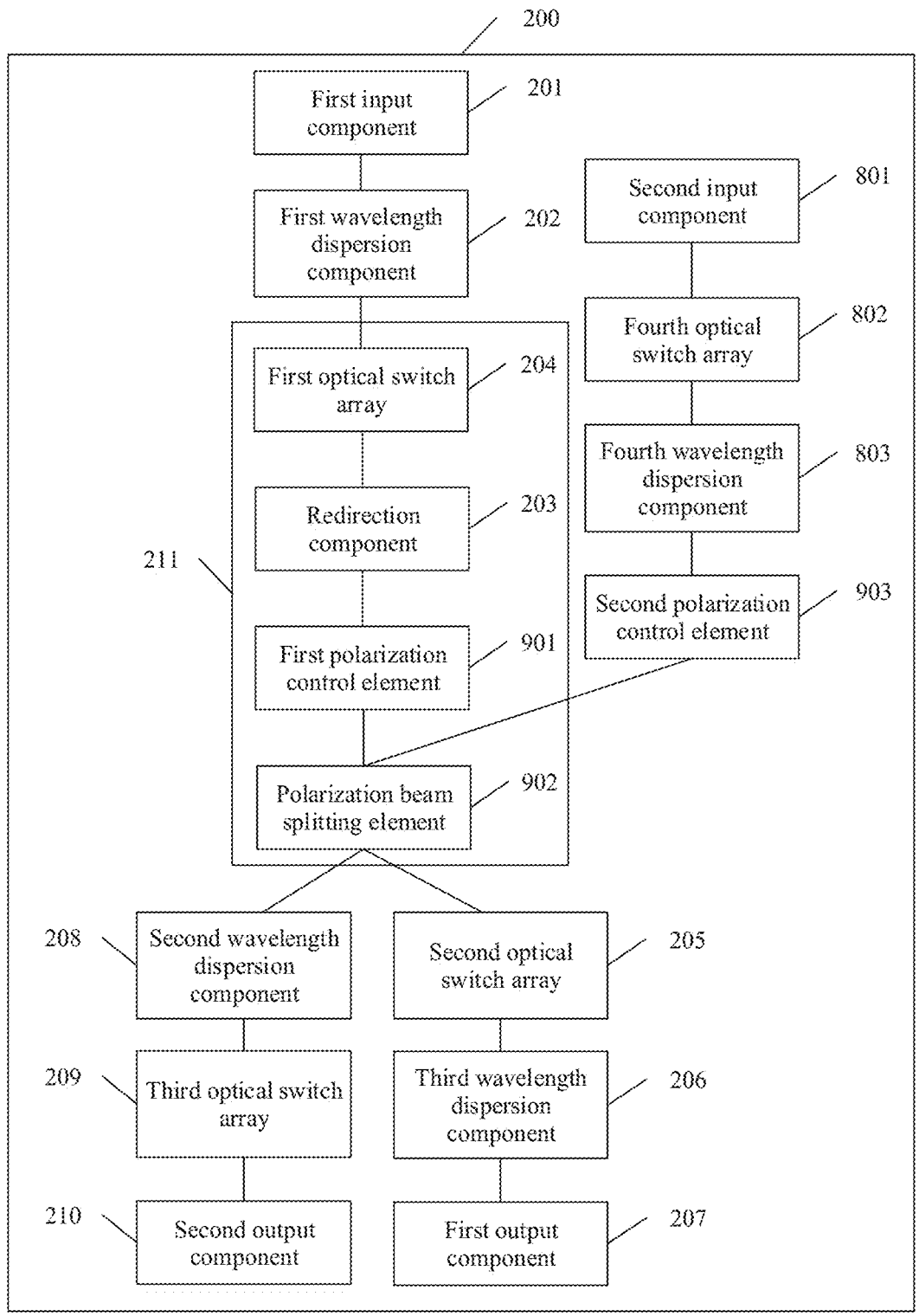
FIG. 10 is a schematic architectural diagram of an optical communications apparatus according to an embodiment of the present invention.

FIG. 10 is a schematic architectural diagram of an optical communications apparatus 200 according to an embodiment of the present invention. Specifically, the optical communications apparatus 200 in this embodiment may be a reconfigurable optical add/drop multiplexer ROADM. As shown in FIG. 10, an ROADM architecture provided in this embodiment of the present invention includes: a first input component 201, a first wavelength dispersion component 202, a second wavelength dispersion component 208, a third wavelength dispersion component 206, a first optical switch array 204, a second optical switch array 205, a third optical switch array 209, a first output component 207, a redirection component 203, a second output component 210, a first polarization control element 901, and a polarization beam splitting element 902.

For descriptions of the first input component 201, the first wavelength dispersion component 202, the second wavelength dispersion component 208, the third wavelength dispersion component 206, the second optical switch array 205, the third optical switch array 209, the first output component 207, and the second output component 210, refer to the descriptions in the foregoing embodiments, and details are not described herein again.

In this embodiment of this application, the first optical switch array 204 is configured to perform angle deflection on a plurality of first sub-wavelength light beams, and propagate the plurality of first sub-wavelength light beams to the first polarization control element 901 through the redirection component 203.

The first polarization control element 901 is configured to change a polarization state of the plurality of incident first sub-wavelength light beams, and output a plurality of second sub-wavelength light beams or a plurality of third sub-wavelength light beams to the polarization beam splitting element 902. A polarization state of the plurality of second sub-wavelength light beams and a polarization state of the plurality of third sub-wavelength light beams are orthogonal to each other.

In this embodiment of this application, the first polarization control element 901 may be a half-wave plate, a liquid crystal modulated lens, or another first polarization control element. The polarization beam splitting element may change a polarization state of a light beam, so that the polarization state of the light beam is one of two mutually orthogonal polarization states.

In this embodiment of this application, the first polarization control element 901 may determine an output port type corresponding to a first light beam, and change the polarization state of the first sub-wavelength light beam to a polarization state corresponding to the corresponding output port type based on the output port type corresponding to the first light beam.

If the polarization beam splitting element 902 receives the plurality of second sub-wavelength light beams incident from the first polarization control element, the polarization beam splitting element 902 is configured to control a light beam propagation direction of the plurality of second sub-wavelength light beams, so that the plurality of second sub-wavelength light beams are incident to the second optical switch array 205. If the polarization beam splitting element 902 receives the plurality of third sub-wavelength light beams incident from the first polarization control element, the polarization beam splitting element 902 is configured to control a light beam propagation direction of the plurality of third sub-wavelength light beams, so that the plurality of third sub-wavelength light beams are incident to the second wavelength dispersion component 208. The light beam propagation direction of the second sub-wavelength light beam is different from that of the third sub-wavelength light beam.

In this embodiment of this application, the optical communications apparatus further includes a second input component 801, a fourth optical switch array 802, a fourth wavelength dispersion component 803, and a second polarization control element 903.

The second input component 801 is configured to input a fourth light beam, and make the fourth light beam incident to the fourth optical switch array.

The fourth optical switch array 802 is configured to perform angle deflection on the fourth light beam to obtain a fifth light beam, and propagate the fifth light beam to the fourth wavelength dispersion component 803.

The fourth wavelength dispersion component 803 is configured to decompose the fifth light beam into a plurality of fourth sub-wavelength light beams, and propagate the plurality of fourth sub-wavelength light beams to the second polarization control element 903.

The second polarization control element 903 is configured to change a polarization state of the plurality of incident fourth sub-wavelength light beams, and output the plurality of fourth sub-wavelength light beams to the polarization beam splitting element 902, so that the polarization beam splitting element 902 propagates the plurality of fourth sub-wavelength light beams to the second optical switch array 205.

In this embodiment of this application, the second polarization control element 903 may be mounted on a client side of the polarization beam splitting element 902, and the second polarization control element 903 may be a non-reciprocal optical rotation component, including but is not limited to a combination of a Faraday rotator and a half-wave plate. The second polarization control element 903 may keep a polarization state of a light beam passing through the second polarization control element 903 from left to right unchanged, and a polarization state of a light beam passing through the second polarization control element 903 from right to left changes and is not limited to an orthogonal state. After the plurality of fourth sub-wavelength light beams pass through the non-reciprocal optical rotation component, the plurality of fourth sub-wavelength light beams bend to a direction of the first output component 207 after passing through the polarization beam splitting element 902. This implements an added function.

An embodiment of this application provides an optical communications apparatus, and the optical communications apparatus may be an ROADM. The first polarization control element 901 may determine an output port type corresponding to a second light beam, and change a polarization state of the second light beam to a polarization state corresponding to the corresponding output port type based on the output port type corresponding to the second light beam. The polarization beam splitting element 902 may control a light beam propagation direction of the second light beam based on the polarization state of the second light beam. In this embodiment, an optical path of the first light beam from an input port from a dimension to output from a dimension needs to pass through only two optical switch arrays (the first optical switch array 204 and the second optical switch array 205), and an optical path of the first light beam from the input port from a dimension to output to drop a signal also needs to pass through only two optical switch arrays (the first optical switch array 204 and the third optical switch array 209). In this way, insertion losses caused by one optical switch array are reduced for a to-be-dropped signal, and filtering of the optical switch array is reduced for the to-be-dropped signal. This reduces signal filtering penalty.

Figure 11:
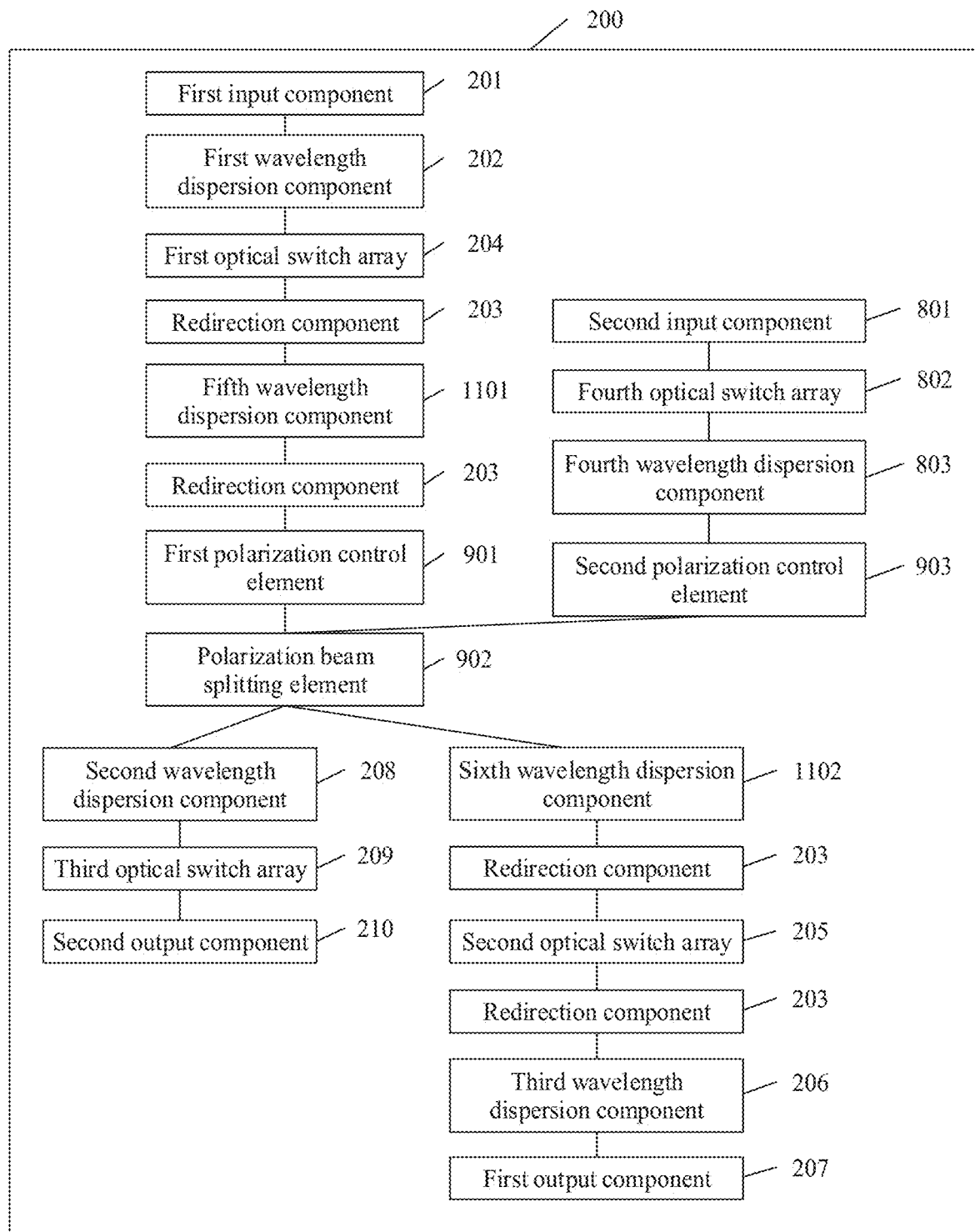
FIG. 11 is a schematic architectural diagram of an optical communications apparatus according to an embodiment of the present invention.

FIG. 11 is a schematic architectural diagram of an optical communications apparatus 200 according to an embodiment of the present invention. Specifically, the optical communications apparatus 200 in this embodiment may be a reconfigurable optical add/drop multiplexer ROADM. As shown in FIG. 11, an ROADM architecture provided in this embodiment of the present invention includes: a first input component 201, a second input component 801, a first wavelength dispersion component 202, a second wavelength dispersion component 208, a third wavelength dispersion component 206, a fourth wavelength dispersion component 803, a fifth wavelength dispersion component 1101, a sixth wavelength dispersion component 1102, a first optical switch array 204, a first polarization control element 901, a second polarization control element 903, a polarization beam splitting element 902, a second optical switch array 205, a third optical switch array 209, a fourth optical switch array 802, a first output component 207, a redirection component 203, and a second output component 210.

For descriptions of the first input component 201, the second input component 801, the first wavelength dispersion component 202, the second wavelength dispersion component 208, the third wavelength dispersion component 206, the fourth wavelength dispersion component 803, the first optical switch array 204, the first polarization control element 901, the second polarization control element 903, the polarization beam splitting element 902, the second optical switch array 205, the third optical switch array 209, the fourth optical switch array 802, the first output component 207, the redirection component 203, and the second output component 210, refer to the foregoing embodiments, and details are not described herein again.

In this embodiment, the fifth wavelength dispersion component 1101 is configured to combine a plurality of first sub-wavelength light beams incident from the first optical switch array through the redirection component 203 into a second light beam, and propagate the second light beam to the first polarization control element 901 through the redirection component 203.

The sixth wavelength dispersion component 1102 is configured to decompose the light beam incident from the polarization beam splitting element 902 into a plurality of second sub-wavelength light beams, and propagate the plurality of second sub-wavelength light beams to the second optical switch array 205.

It can be learned from the foregoing that, in this embodiment of this application, the first polarization control element 901 may determine an output port type corresponding to the second light beam, and change a polarization state of the second light beam to a polarization state corresponding to the corresponding output port type based on the output port type corresponding to the second light beam. The polarization beam splitting element 902 may control a light beam propagation direction of the second light beam based on the polarization state of the second light beam. In this embodiment, an optical path of a first light beam from an input port from a dimension to output from a dimension needs to pass through only two optical switch arrays (the first optical switch array 204 and the second optical switch array 205), and an optical path of the light beam from the input port from a dimension to output to drop a signal also needs to pass through only two optical switch arrays (the first optical switch array 204 and the third optical switch array 209). The light beam also needs to pass through only two optical switch arrays from an input port to add a signal to an output port from a dimension. In this way, insertion losses caused by one optical switch array are reduced for each of a to-be-added signal and a to-be-dropped signal, and filtering of the optical switch array is reduced for each of the to-be-added signal and the to-be-dropped signal. This reduces signal filtering penalty.

Figure 12:
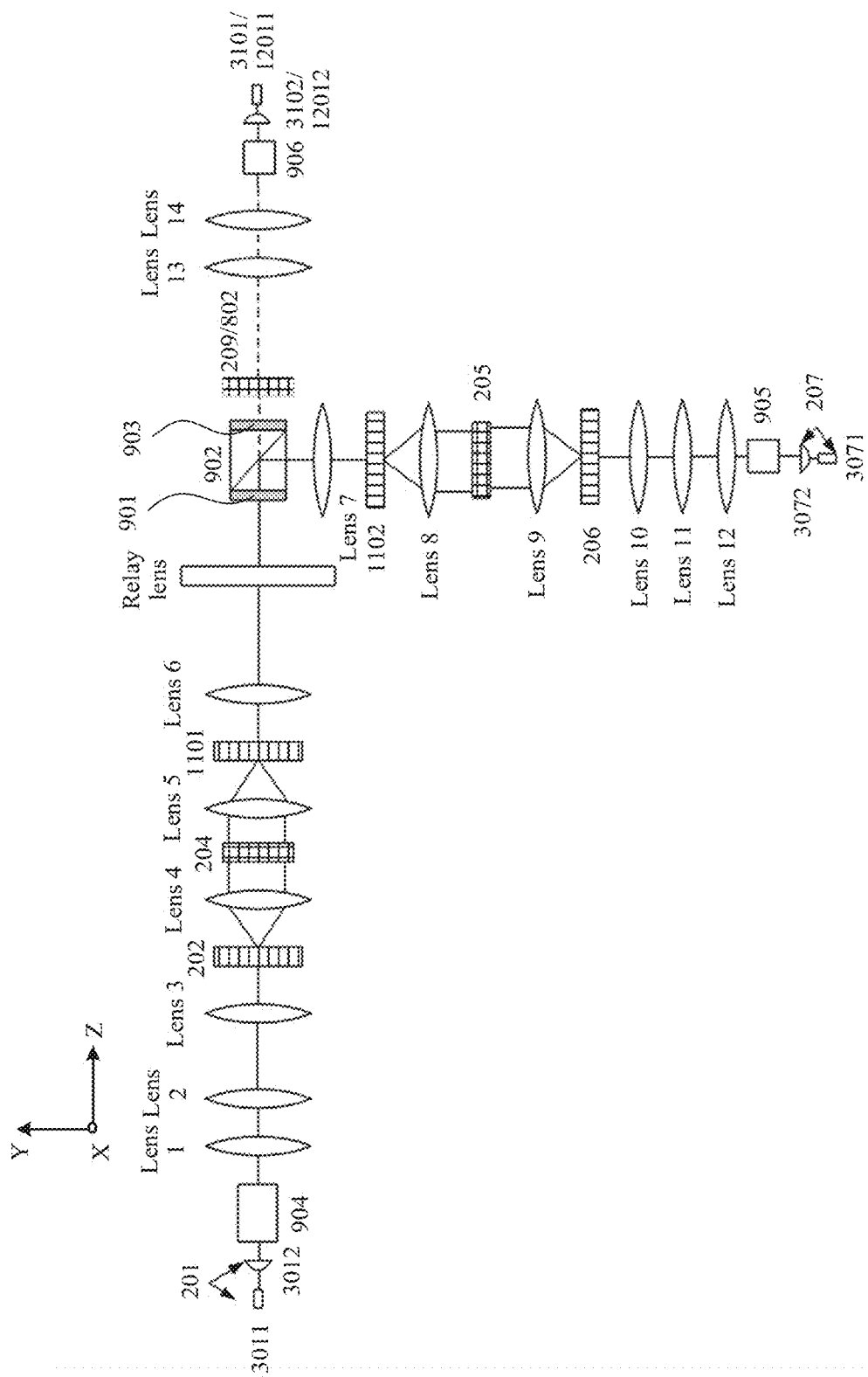
FIG. 12 is a schematic structural diagram of an optical path of an optical communications apparatus on a wavelength plane according to an embodiment of the present invention.
Figure 13A:
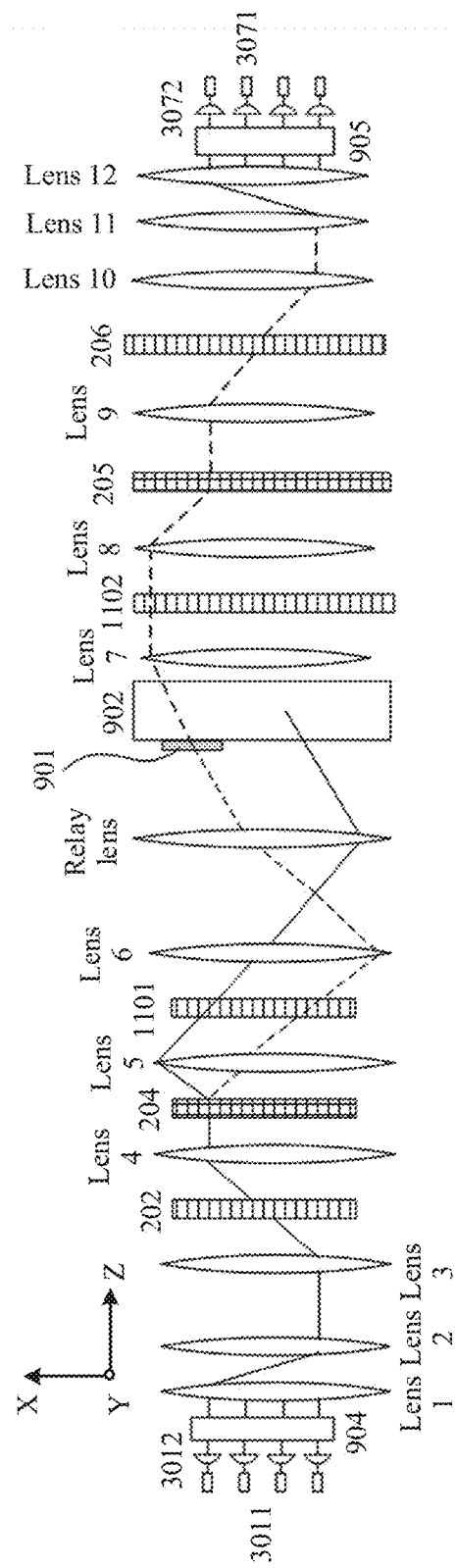
FIG. 13A is a schematic structural diagram of an optical path of an optical communications apparatus on a port switching plane according to an embodiment of the present invention.
Figure 13B:
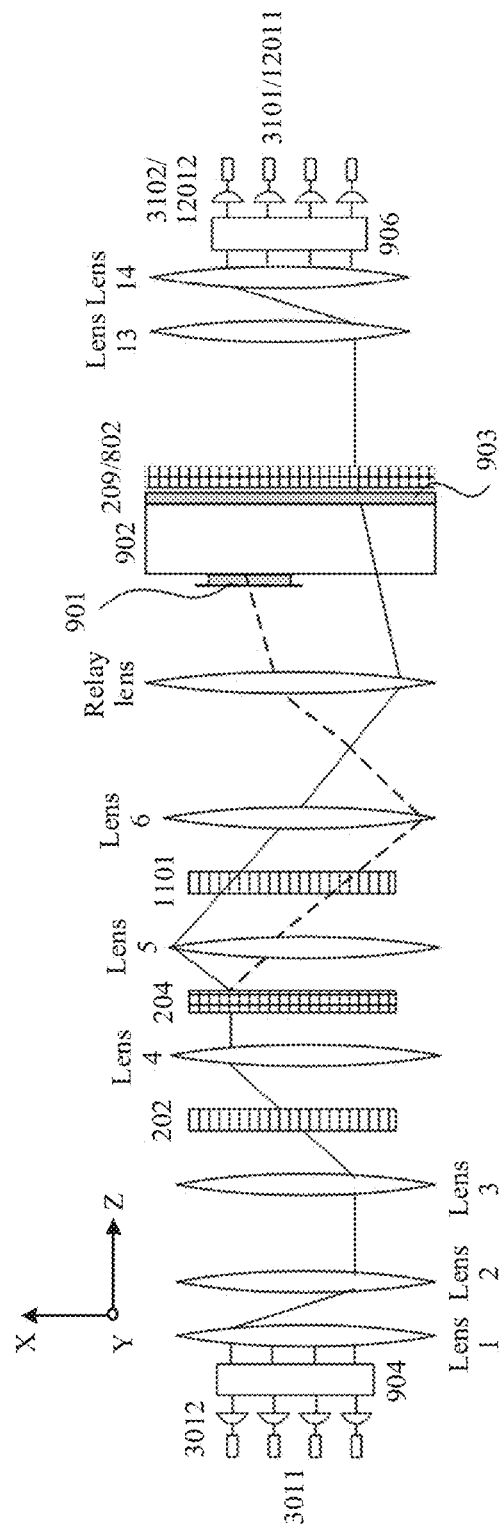
FIG. 13B is a schematic structural diagram of an optical path of an optical communications apparatus on a port switching plane according to an embodiment of the present invention.

FIG. 12 is a schematic structural diagram of an optical path of an optical communications apparatus on a wavelength plane according to an embodiment of the present invention. FIG. 13A is a schematic structural diagram of an optical path of an optical communications apparatus on a port switching plane according to an embodiment of the present invention. FIG. 13B is a schematic structural diagram of an optical path of an optical communications apparatus on a port switching plane according to an embodiment of the present invention. The wavelength plane is a YOZ plane, and a port switching plane is an XOZ plane. Specifically, as shown in FIG. 12, an ROADM includes: a first input component 201, a second input component 801, a first wavelength dispersion component 202, a third wavelength dispersion component 206, a fifth wavelength dispersion component 1101, a sixth wavelength dispersion component 1102, a first optical switch array 204, a first polarization control element 901, a second polarization control element 903, a polarization beam splitting element 902, a second optical switch array 205, a third optical switch array 209, a fourth optical switch array 802, a first output component 207, a redirection component 203, and a second output component 210.

For specific descriptions of the first input component 201, refer to the foregoing embodiments, and details are not described herein again.

Optionally, in this embodiment of this application, a third polarization control element 904 may further be included. The third polarization control element 904 may convert deflection states of incident light beams into a same polarization state. For example, this can be implemented by using a combination of a Yttrium vanadate lens and a half-wave plate or a combination of a Wallaston prism and a half-wave plate, but this is not limited thereto.

Optionally, in this embodiment of this application, a spot beam expansion component including a lens 1 and a lens 2 may further be included.

For specific descriptions of the first wavelength dispersion component 202, refer to the foregoing embodiments, and details are not described herein again.

Optionally, the redirection component 203 in this embodiment of this application may include a 4f system including a lens 3 and a lens 4.

For specific descriptions of the first optical switch array 204 and the fifth wavelength dispersion component 1101, refer to the foregoing embodiments, and details are not described herein again.

Optionally, the redirection component 203 in this embodiment of this application may include a 4f system including a lens 5 and a lens 6, and a relay lens. The relay lens may relocate an incident light beam to the first polarization control element 901.

For specific descriptions of the first polarization control element 901, the polarization beam splitting element 902, and the sixth wavelength dispersion component 1102, refer to the foregoing embodiments, and details are not described herein again.

Optionally, the redirection component 203 in this embodiment of this application may include a 4f system including a lens 7 and a lens 8.

For specific descriptions of the second optical switch array 205 and the third wavelength dispersion component 206, refer to the foregoing embodiments, and details are not described herein again.

Optionally, the redirection component 203 in this embodiment of this application may include a 4f system including a lens 9 and a lens 10.

Optionally, in this embodiment of this application, a spot beam expansion component including a lens 11 and a lens 12 may further be included.

Optionally, in this embodiment of this application, a fourth polarization control element 905 may further be included. The fourth polarization control element 905 may convert a deflection state of an incident light beam into a polarization state the same as that of a first light beam incident from the first input component.

For specific descriptions of the first output component 207 and the third optical switch array 209, refer to the foregoing embodiments, and details are not described herein again.

Optionally, in this embodiment of this application, a spot beam expansion component including a lens 13 and a lens 14 may further be included.

Optionally, in this embodiment of this application, a fifth polarization control element 906 may further be included. The fifth polarization control element 906 may convert a deflection state of an incident light beam into a polarization state the same as that of a first light beam incident from the first input component.

For specific descriptions of the second output component 210, the second input component 801, the fourth optical switch array 802, and the second polarization control element 903, refer to the foregoing embodiments, and details are not described herein again.

Optionally, in this embodiment of this application, the second input component 801 may include an input optical fiber array 12011 and an input collimator array 12012.

It should be noted that an input optical fiber array 3101, the input optical fiber array 12011, an input collimator array 3102, the input collimator array 12012, the third optical switch array 209, and the fourth optical switch array 802 shown in FIG. 12 are in a same position on a dispersion switching plane. In actual application, the input optical fiber array 3101, the input optical fiber array 12011, the input collimator array 3102, the input collimator array 12012, the third optical switch array 209, and the fourth optical switch array 802 may alternatively not be located in a same position on a dispersion switching plane. This is not limited herein.

Figure 14:
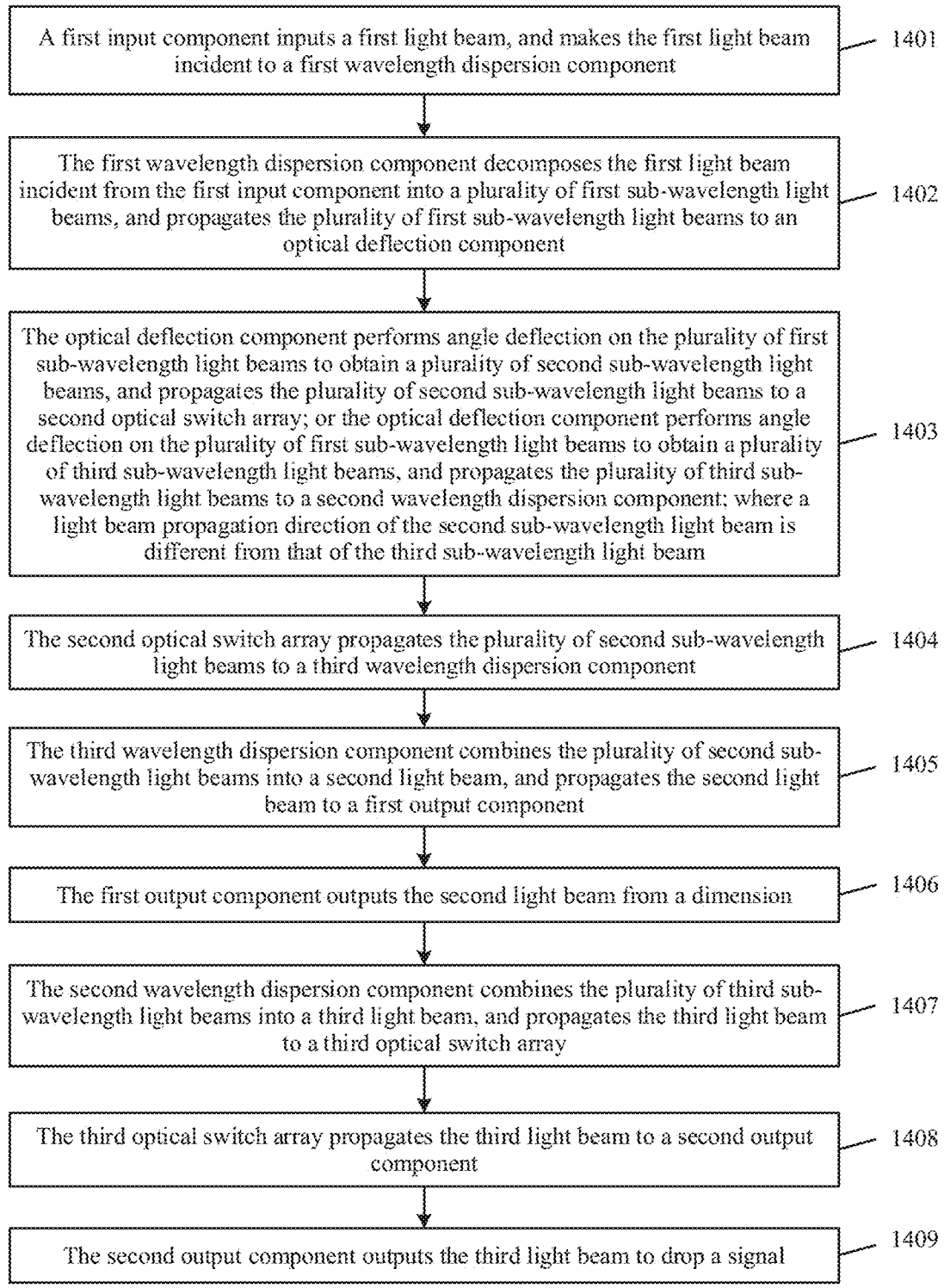
FIG. 14 is a flowchart of a wavelength selection method according to an embodiment of the present invention.

FIG. 14 is an example of a flowchart of a wavelength selection method according to an embodiment of the present invention. The method may be performed by an ROADM, and specifically includes the following steps.

1401: A first input component inputs a first light beam and makes the first light beam incident to a first wavelength dispersion component.

1402: The first wavelength dispersion component decomposes the first light beam incident from the first input component into a plurality of first sub-wavelength light beams, and propagates the plurality of first sub-wavelength light beams to an optical deflection component.

1403: The optical deflection component performs angle deflection on the plurality of first sub-wavelength light beams to obtain a plurality of second sub-wavelength light beams, and propagates the plurality of second sub-wavelength light beams to a second optical switch array; the optical deflection component further performs angle deflection on the plurality of first sub-wavelength light beams to obtain a plurality of third sub-wavelength light beams, and propagates the plurality of third sub-wavelength light beams to a second wavelength dispersion component; and a light beam propagation direction of the second sub-wavelength light beam is different from that of the third sub-wavelength light beam.

1404: The second optical switch array propagates the plurality of second sub-wavelength light beams to a third wavelength dispersion component.

1405: The third wavelength dispersion component combines the plurality of second sub-wavelength light beams into a second light beam, and propagates the second light beam to a first output component.

1406: The first output component outputs the second light beam from a dimension.

1407: The second wavelength dispersion component combines the plurality of third sub-wavelength light beams into a third light beam, and propagates the third light beam to a third optical switch array.

1408: The third optical switch array propagates the third light beam to a second output component.

1409: The second output component outputs the third light beam to drop a signal.

Optionally, the optical deflection component includes a first optical switch array and a redirection component.

That the optical deflection component performs angle deflection on the plurality of first sub-wavelength light beams to obtain a plurality of second sub-wavelength light beams, and propagates the plurality of second sub-wavelength light beams to a second optical switch array; the optical deflection component further performs angle deflection on the plurality of first sub-wavelength light beams to obtain a plurality of third sub-wavelength light beams, and propagates the plurality of third sub-wavelength light beams to a second wavelength dispersion component; and that a light beam propagation direction of the second sub-wavelength light beam is different from that of the third sub-wavelength light beam includes:

The first optical switch array performs angle deflection on the plurality of first sub-wavelength light beams to obtain the plurality of second sub-wavelength light beams, and propagates the plurality of second sub-wavelength light beams to the second optical switch array through the redirection component; and the first optical switch array further performs angle deflection on the plurality of first sub-wavelength light beams to obtain the plurality of third sub-wavelength light beams, and propagates the plurality of third sub-wavelength light beams to the second wavelength dispersion component through the redirection component.

Optionally, that the first wavelength dispersion component decomposes the first light beam incident from the first input component into a plurality of first sub-wavelength light beams includes:

The first wavelength dispersion component decomposes, on a first plane, the first light beam incident from the first input component into the plurality of first sub-wavelength light beams.

Optionally, that the first optical switch array performs angle deflection on the plurality of first sub-wavelength light beams to obtain the plurality of second sub-wavelength light beams, and propagates the plurality of second sub-wavelength light beams to the second optical switch array through the redirection component; and that the first optical switch array further performs angle deflection on the plurality of first sub-wavelength light beams to obtain the plurality of third sub-wavelength light beams, and propagates the plurality of third sub-wavelength light beams to the second wavelength dispersion component through the redirection component includes:

The first optical switch array performs angle deflection on the plurality of first sub-wavelength light beams on at least one of the first plane and a second plane to obtain the plurality of second sub-wavelength light beams, and propagates the plurality of second sub-wavelength light beams to the second optical switch array through the redirection component. The first optical switch array further performs angle deflection on the plurality of first sub-wavelength light beams on at least one of the first plane and the second plane to obtain the plurality of third sub-wavelength light beams, and propagates the plurality of third sub-wavelength light beams to the second wavelength dispersion component through the redirection component. The first plane and the second plane are orthogonal to each other.

Optionally, the redirection component includes a first lens, a second lens, and a third lens.

The second lens is located on a back focal plane of the first lens, the second lens is located on a front focal plane of the third lens, the second optical switch array is located on a back focal plane of the second lens, and the first optical switch array is located on a front focal plane of the second lens.

That the first optical switch array propagates the plurality of second sub-wavelength light beams to a second optical switch array through the redirection component includes: propagating the plurality of second sub-wavelength light beams to the second optical switch array through the first lens, the second lens, and the third lens.

Optionally, the second wavelength dispersion component is located on the back focal plane of the first lens.

That the first optical switch array propagates the plurality of third sub-wavelength light beams to the second wavelength dispersion component through the redirection component includes: propagating the plurality of third sub-wavelength light beams to the second wavelength dispersion component through the first lens.

Optionally, the second wavelength dispersion component is located on the back focal plane of the second lens.

That the first optical switch array propagates the plurality of third sub-wavelength light beams to the second wavelength dispersion component through the redirection component includes: propagating the plurality of third sub-wavelength light beams to the second wavelength dispersion component through the second lens.

Optionally, the method further includes:

A second input component inputs a fourth light beam, and makes the fourth light beam incident to a fourth optical switch array.

The fourth optical switch array performs angle deflection on the fourth light beam to obtain a fifth light beam, and propagates the fifth light beam to a fourth wavelength dispersion component.

The fourth wavelength dispersion component decomposes the fifth light beam into a plurality of fourth sub-wavelength light beams, and propagates the plurality of fourth sub-wavelength light beams to the second optical switch array through the redirection component.

The second optical switch array further performs angle deflection on the plurality of fourth sub-wavelength light beams to obtain a plurality of fifth sub-wavelength light beams, and propagates the plurality of fifth sub-wavelength light beams to the third wavelength dispersion component.

Optionally, that the fourth wavelength dispersion component decomposes the fifth light beam into a plurality of fourth sub-wavelength light beams includes:

The fourth wavelength dispersion component decomposes, on the first plane, the fifth light beam into the plurality of fourth sub-wavelength light beams.

Optionally, that the fourth optical switch array performs angle deflection on the fourth light beam to obtain a fifth light beam includes:

The fourth optical switch array performs angle deflection on the fourth light beam on at least one of the first plane and the second plane to obtain the fifth light beam.

That the second optical switch array performs angle deflection on the plurality of fourth sub-wavelength light beams to obtain a plurality of fifth sub-wavelength light beams includes:

The second optical switch array performs angle deflection on the plurality of fourth sub-wavelength light beams on at least one of the first plane and the second plane to obtain the plurality of fifth sub-wavelength light beams, where the first plane and the second plane are orthogonal to each other.

Optionally, the redirection component includes the first lens, the second lens, and the third lens.

The second lens is located on the back focal plane of the first lens, the second lens is located on the front focal plane of the third lens, the fourth wavelength dispersion component is located on the front focal plane of the third lens, and the second optical switch array is located on a back focal plane of the third lens.

That the fourth wavelength dispersion component propagates the plurality of fourth sub-wavelength light beams to the second optical switch array through the redirection component includes: propagating the plurality of fourth sub-wavelength light beams to the second optical switch array through the third lens.

Optionally, the redirection component includes the first lens, the second lens, and the third lens.

The second lens is located on the back focal plane of the first lens, the second lens is located on the front focal plane of the third lens, the fourth wavelength dispersion component is located on the front focal plane of the second lens, and the second optical switch array is located on the back focal plane of the second lens.

That the fourth wavelength dispersion component propagates the plurality of fourth sub-wavelength light beams to the second optical switch array through the redirection component includes: propagating the plurality of fourth sub-wavelength light beams to the second optical switch array through the second lens.

Optionally, the optical deflection component includes a first optical switch array, a redirection component, a first polarization control element, and a polarization beam splitting element.

That the optical deflection component performs angle deflection on the plurality of first sub-wavelength light beams to obtain a plurality of second sub-wavelength light beams, and propagates the plurality of second sub-wavelength light beams to a second optical switch array; the optical deflection component further performs angle deflection on the plurality of first sub-wavelength light beams to obtain a plurality of third sub-wavelength light beams, and propagates the plurality of third sub-wavelength light beams to a second wavelength dispersion component; and a light beam propagation direction of the second sub-wavelength light beam is different from that of the third sub-wavelength light beam includes:

The first optical switch array performs angle deflection on the plurality of first sub-wavelength light beams, and propagates the plurality of first sub-wavelength light beams to the first polarization control element through the redirection component.

The first polarization control element changes a polarization state of the plurality of incident first sub-wavelength light beams, and outputs the plurality of second sub-wavelength light beams or the plurality of third sub-wavelength light beams to the polarization beam splitting element. A polarization state of the plurality of second sub-wavelength light beams and a polarization state of the plurality of third sub-wavelength light beams are orthogonal to each other.

If the polarization beam splitting element receives the plurality of second sub-wavelength light beams incident from the first polarization control element, the polarization beam splitting element controls the light beam propagation direction of the plurality of second sub-wavelength light beams, so that the plurality of second sub-wavelength light beams are incident to the second optical switch array. If the polarization beam splitting element receives the plurality of third sub-wavelength light beams incident from the first polarization control element, the polarization beam splitting element controls the light beam propagation direction of the plurality of third sub-wavelength light beams, so that the plurality of third sub-wavelength light beams are incident to the second wavelength dispersion component. The light beam propagation direction of the second sub-wavelength light beam is different from that of the third sub-wavelength light beam.

Optionally, the method further includes:

A second input component inputs a fourth light beam, and makes the fourth light beam incident to a fourth optical switch array.

The fourth optical switch array performs angle deflection on the fourth light beam to obtain a fifth light beam, and propagates the fifth light beam to a fourth wavelength dispersion component.

The fourth wavelength dispersion component decomposes the fifth light beam into a plurality of fourth sub-wavelength light beams, and propagates the plurality of fourth sub-wavelength light beams to a second polarization control element.

The second polarization control element changes a polarization state of the plurality of incident fourth sub-wavelength light beams, and outputs the plurality of fourth sub-wavelength light beams to the polarization beam splitting element, so that the polarization beam splitting element propagates the plurality of fourth sub-wavelength light beams to the second optical switch array.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The foregoing are merely several embodiments of the present invention. A person skilled in the art may make various modifications and variations to the present invention without departing from the spirit and scope of the present invention.

What is claimed is:

1. An optical communications apparatus, comprising:
   a first input component configured to input a first light beam and propagate the first light beam;
   a first wavelength dispersion component coupled to the first input component and configured to decompose the first light beam incident from the first input component into a plurality of first sub-wavelength light beams, and propagate the plurality of first sub-wavelength light beams;
   an optical deflection component coupled to the first wavelength dispersion component and configured to perform angle deflection on the plurality of first sub-wavelength light beams to obtain a plurality of second sub-wavelength light beams and a plurality of third sub-wavelength light beams, wherein the optical deflection component is further configured to propagate the plurality of second sub-wavelength light beams and the plurality of third sub-wavelength light beams, and wherein a second light beam propagation direction of one of the second sub-wavelength light beams is different from that of a third light beam propagation direction of one of the third sub-wavelength light beams;
   a second optical switch array coupled to the optical deflection component and configured to propagate the plurality of second sub-wavelength light beams;
   a third wavelength dispersion component coupled to the second optical switch array and configured to combine the plurality of second sub-wavelength light beams into a second light beam, and propagate the second light beam;
   a first output component coupled to the third wavelength dispersion component and configured to output the second light beam from a dimension;
   a second wavelength dispersion component coupled to the optical deflection component and configured to combine the plurality of third sub-wavelength light beams into a third light beam, and propagate the third light beam;
   a third optical switch array coupled to the second wavelength dispersion component and configured to propagate the third light beam; and
   a second output component coupled to the third optical switch array and configured to output the third light beam to drop a signal.

2. The optical communications apparatus according to claim 1, wherein the optical deflection component comprises a first optical switch array and a redirection component, wherein the first optical switch array is configured to
   perform angle deflection on the plurality of first sub-wavelength light beams to obtain the plurality of second sub-wavelength light beams and the plurality of third sub-wavelength light beams;
   propagate the plurality of second sub-wavelength light beams to the second optical switch array through the redirection component; and propagate the plurality of third sub-wavelength light beams to the second wavelength dispersion component through the redirection component.

3. The optical communications apparatus according to claim 2, wherein the first wavelength dispersion component is configured to decompose, on a first plane, the first light beam from the first input component into the plurality of first sub-wavelength light beams.

4. The optical communications apparatus according to claim 3, wherein the first optical switch array is further configured to:
  perform angle deflection on the plurality of first sub-wavelength light beams on at least one of the first plane or a second plane to obtain the plurality of second sub-wavelength light beams, wherein the first plane and the second plane are orthogonal to each other;
  propagate the plurality of second sub-wavelength light beams to the second optical switch array through the redirection component;
  perform angle deflection on the plurality of first sub-wavelength light beams on at least one of the first plane or the second plane to obtain the plurality of third sub-wavelength light beams; and
  propagate the plurality of third sub-wavelength light beams to the second wavelength dispersion component through the redirection component.

5. The optical communications apparatus according to claim 2, wherein the redirection component comprises a first lens, a second lens, and a third lens, wherein the second lens is located on a first back focal plane of the first lens and on a third front focal plane of the third lens, wherein the second optical switch array is located on a second back focal plane of the second lens, wherein the first optical switch array is located on a second front focal plane of the second lens, and wherein the first lens, the second lens, and the third lens are configured to propagate the plurality of second sub-wavelength light beams to the second optical switch array.

6. The optical communications apparatus according to claim 5, wherein the second wavelength dispersion component is located on the first back focal plane of the first lens, and wherein the first lens is further configured to propagate the plurality of third sub-wavelength light beams to the second wavelength dispersion component.

7. The optical communications apparatus according to claim 5, wherein the second wavelength dispersion component is located on the second back focal plane of the second lens, and wherein the second lens is configured to propagate the plurality of third sub-wavelength light beams to the second wavelength dispersion component.

8. The optical communications apparatus according to claim 2, further comprising:
  a second input component configured to input a fourth light beam;
  a fourth optical switch array coupled to the second input component and configured to perform angle deflection on the fourth light beam to obtain a fifth light beam, and propagate the fifth light beam; and
  a fourth wavelength dispersion component coupled to the fourth optical switch array and configured to decompose the fifth light beam into a plurality of fourth sub-wavelength light beams, and propagate the plurality of fourth sub-wavelength light beams to the second optical switch array, wherein the second optical switch array is further configured to perform angle deflection on the plurality of fourth sub-wavelength light beams to obtain a plurality of fifth sub-wavelength light beams, and propagate the plurality of fifth sub-wavelength light beams to the third wavelength dispersion component.

9. The optical communications apparatus according to claim 1, further comprising:
  a redirection component;
  a first optical switch array is coupled to the redirection component and component and configured to perform angle deflection on the plurality of first sub-wavelength light beams, and propagate the plurality of first sub-wavelength light beams through the redirection component;
  a first polarization control element coupled to the redirection component and configured to change a polarization state of the plurality of first sub-wavelength light beams, and output the plurality of second sub-wavelength light beams or the plurality of third sub-wavelength light beams, wherein a second polarization state of the plurality of second sub-wavelength light beams and a third polarization state of the plurality of third sub-wavelength light beams are orthogonal to each other; and
  a polarization beam splitting element coupled to the first polarization control element and configured to:
    receive at least one of the plurality of second sub-wavelength light beams or the plurality of third sub-wavelength light beams from the first polarization control element;
    control the second light beam propagation direction so that the plurality of second sub-wavelength light beams are incident to the second optical switch array when the polarization beam splitting element receives the plurality of second sub-wavelength light beams from the first polarization control element; and
    control the third light beam propagation direction so that the plurality of third sub-wavelength light beams are incident to the second wavelength dispersion component when the polarization beam splitting element receives the plurality of third sub-wavelength light beams from the first polarization control element.

10. The optical communications apparatus according to claim 9, further comprising:
  a fourth optical switch array;
  a second input component configured to input a fourth light beam, and make the fourth light beam incident to the fourth optical switch array, wherein the fourth optical switch array is configured to perform angle deflection on the fourth light beam to obtain a fifth light beam, and propagate the fifth light beam;
  a fourth wavelength dispersion component coupled to the fourth optical switch array and configured to decompose the fifth light beam into a plurality of fourth sub-wavelength light beams, and propagate the plurality of fourth sub-wavelength light beams; and
  a second polarization control element coupled to the fourth wavelength dispersion component and configured to change a polarization state of the plurality of fourth sub-wavelength light beams, and output the plurality of fourth sub-wavelength light beams to the polarization beam splitting element such that the polarization beam splitting element propagates the plurality of fourth sub-wavelength light beams to the second optical switch array.

11. The optical communications apparatus according to claim 9, further comprising:

a fifth wavelength dispersion component coupled to the first optical switch array and the redirection component, wherein the first optical switch array is configured to perform angle deflection on the plurality of first sub-wavelength light beams and propagate the plurality of first sub-wavelength light beams to the fifth wavelength dispersion component, and wherein the fifth wavelength dispersion component is configured to combine the plurality of first sub-wavelength light beam from the first optical switch array, and propagate a combined light beam to the first polarization control element through the redirection component; and a sixth wavelength dispersion component coupled to second optical switch array and configured to decompose a light beam incident from the polarization beam splitting element into the plurality of second sub-wavelength light beams, and propagate the plurality of second sub-wavelength light beams to the second optical switch array.

12. An optical communications apparatus, comprising:
a first input component configured to input a first light beam and propagate the first light beam;
a first wavelength dispersion component coupled to the first input component and configured to decompose the first light beam from the first input component into a plurality of first sub-wavelength light beams, and propagate the plurality of first sub-wavelength light beams;
an optical deflection component coupled to the first wavelength dispersion component and configured to perform angle deflection on the plurality of first sub-wavelength light beams to obtain a plurality of second sub-wavelength light beams, and propagate the plurality of second sub-wavelength light beams;
a second optical switch array coupled to the optical deflection component and configured to propagate the plurality of second sub-wavelength light beams;
a third wavelength dispersion component coupled to the second optical switch array and configured to combine the plurality of second sub-wavelength light beams into a second light beam, and propagate the second light beam; and
a first output component coupled to the third wavelength dispersion component and configured to output the second light beam from a dimension.

13. The optical communications apparatus according to claim 12, wherein the optical deflection component comprises a first optical switch array and a redirection component, and wherein the first optical switch array is configured to
perform angle deflection on the plurality of first sub-wavelength light beams to obtain the plurality of second sub-wavelength light beams; and
propagate the plurality of second sub-wavelength light beams to the second optical switch array through the redirection component.

14. The optical communications apparatus according to claim wherein the first wavelength dispersion component is configured to decompose, on a first plane, the first light beam from the first input component into the plurality of first sub-wavelength light beams.

15. The optical communications apparatus according to claim 14, wherein the first optical switch array is configured to:
perform angle deflection on the plurality of first sub-wavelength light beams on at least one of the first plane or a second plane to obtain the plurality of second sub-wavelength light beams; and
propagate the plurality of second sub-wavelength light beams to the second optical switch array through the redirection component.

16. The optical communications apparatus according to claim 12, further comprising:
a fourth optical switch array;
a second input component coupled to the fourth optical switch array and configured to input a fourth light beam, and make the fourth light beam incident to the fourth optical switch array, wherein the fourth optical switch array is configured to perform angle deflection on the fourth light beam to obtain a fifth light beam, and propagate the fifth light beam; and
a fourth wavelength dispersion component coupled to the fourth optical switch array and configured to decompose the fifth light beam into a plurality of fourth sub-wavelength light beams, and propagate the plurality of fourth sub-wavelength light beams to the second optical switch array,
wherein the second optical switch array is further configured to perform angle deflection on the plurality of fourth sub-wavelength light beams to obtain a plurality of fifth sub-wavelength light beams, and propagate the plurality of fifth sub-wavelength light beams to the third wavelength dispersion component.

17. An optical communications apparatus, comprising:
a first input component configured to input a first light beam and propagate the first light beam;
a first wavelength dispersion component coupled to the first input component and configured to decompose the first light beam incident from the first input component into a plurality of first sub-wavelength light beams, and propagate the plurality of first sub-wavelength light beams;
an optical deflection component coupled to the first wavelength dispersion component and configured to perform angle deflection on the plurality of first sub-wavelength light beams to obtain a plurality of third sub-wavelength light beams, and propagate the plurality of third sub-wavelength light beams;
a second wavelength dispersion component coupled to the optical deflection component and configured to combine the plurality of third sub-wavelength light beams into a third light beam, and propagate the third light beam;
a third optical switch array coupled to the second wavelength dispersion component and configured to propagate the third light beam; and
a second output component coupled to the third optical switch array and configured to output the third light beam to drop a signal.

18. The optical communications apparatus according to claim 17, wherein the optical deflection component comprises a first optical switch array and a redirection component, and wherein the first optical switch array is configured to perform angle deflection on the plurality of first sub-wavelength light beams to obtain the plurality of third sub-wavelength light beams, and propagate the plurality of third sub-wavelength light beams to the second wavelength dispersion component through the redirection component.

19. The optical communications apparatus according to claim 18, wherein the first wavelength dispersion component is configured to decompose, on a first plane, the first light beam from the first input component into the plurality of first sub-wavelength light beams.

20. The optical communications apparatus according to claim 19, wherein the first optical switch array is further configured to perform angle deflection on the plurality of first sub-wavelength light beams on at least one of the first plane or a second plane to obtain the plurality of third sub-wavelength light beams, and propagate the plurality of third sub-wavelength light beams to the second wavelength dispersion component through the redirection component, and wherein the first plane and the second plane are orthogonal to each other.

* * * * *

UNITED STATES PATENT AND TRADEMARK OFFICE
CERTIFICATE OF CORRECTION

PATENT NO. : 11,728,919 B2
APPLICATION NO. : 17/514557
DATED : August 15, 2023
INVENTOR(S) : Wei Jia and Bing Zou It is certified that error appears in the above-identified patent and that said Letters Patent is hereby corrected as shown below:

In the Claims

Claim 2, Column 42, Line 60: "configured to" should read "configured to:"

Claim 13, Column 45, Line 51: "to" should read "to:"

Claim 14, Column 45, Line 59: "claim wherein" should read "claim 13, wherein"

Signed and Sealed this
Tenth Day of October, 2023

Katherine Kelly Vidal
*Director of the United States Patent and Trademark Office*